United States Patent
Carter et al.

(10) Patent No.: US 10,051,476 B2
(45) Date of Patent: Aug. 14, 2018

(54) SYSTEMS AND METHODS FOR BUILDING AND UPDATING A WIRELESS NODE DATABASE SERVICE

(71) Applicant: BSG WIRELESS LIMITED, Aldermaston, Berkshire (GB)

(72) Inventors: Mark Ian Carter, Aldermaston (GB); Charles Nicholas Allgrove, Carlisle (GB)

(73) Assignee: BSG WIRELESS LIMITED, Aldermaston, Berkshire (GB)

( * ) Notice: Subject to any disclaimer, the term of this patent is extended or adjusted under 35 U.S.C. 154(b) by 0 days.

(21) Appl. No.: 15/842,706

(22) Filed: Dec. 14, 2017

(65) Prior Publication Data

US 2018/0176784 A1 Jun. 21, 2018

Related U.S. Application Data

(60) Provisional application No. 62/435,557, filed on Dec. 16, 2016.

(51) Int. Cl.
*H04W 16/00* (2009.01)
*G06F 17/30* (2006.01)
*H04W 64/00* (2009.01)

(52) U.S. Cl.
CPC ...... *H04W 16/00* (2013.01); *G06F 17/30292* (2013.01); *G06F 17/30371* (2013.01); *H04W 64/00* (2013.01)

(58) Field of Classification Search
CPC ....... H04W 64/00; H04W 4/02; H04W 4/029; H04W 84/12; H04W 64/003;
(Continued)

(56) References Cited

U.S. PATENT DOCUMENTS 7,257,413 B2 8/2007 Sheynblat
7,433,673 B1 * 10/2008 Everson ............... H04W 4/02
455/404.1
(Continued)

FOREIGN PATENT DOCUMENTS

GB 2422274 B 7/2006
GB 2440193 A 1/2008
(Continued)

OTHER PUBLICATIONS

International Search Report and Written Opinion, PCT/IB2017/058013, dated Mar. 2, 2018.

*Primary Examiner* — Kwasi Karikari
(74) *Attorney, Agent, or Firm* — Winston & Strawn LLP

(57) ABSTRACT

Embodiments of the present invention are directed to a system and method that can obtain a collection of wireless node data from different sources. The system and method involves a wireless location data service (WLDS) platform including a data management and a feedback module. The data management is configured to receive wireless node data through importation by a service provider. The feedback module is configured to receive wireless node data from mobile devices, engineering systems, systems generating activity logs, and third party service partners. The system and method also involves an end-user module configured to collect wireless node data and user reported corrections and transmit the collected data and corrections to the platform. A wireless node database in the platform is built and updated from the wireless node data and corrections received from the data management module and the feedback module.

9 Claims, 14 Drawing Sheets

(58) Field of Classification Search
CPC ..... H04W 24/10; H04W 4/025; H04W 12/02; G01S 5/0242; G01S 5/14; G01S 13/765; G01S 5/0263; G01S 5/0268; G01S 5/06; G01S 5/10

See application file for complete search history.

(56) References Cited

U.S. PATENT DOCUMENTS

| | | |
|---|---|---|
| 8,188,921 B2 | 5/2012 | Marks et al. |
| 8,483,718 B2 | 7/2013 | Hwang |
| 8,526,368 B2 | 9/2013 | Finlow-Bates et al. |
| 8,630,664 B2 | 1/2014 | Alizadeh-Shabdiz et al. |
| 8,805,403 B2 | 8/2014 | Curticapean et al. |
| 8,866,674 B2 | 10/2014 | Meyer et al. |
| 9,084,122 B2 | 7/2015 | Gao et al. |
| 9,420,425 B1 | 8/2016 | McMullen et al. |
| 2006/0095348 A1 | 5/2006 | Jones et al. |
| 2007/0004428 A1 | 1/2007 | Morgan et al. |
| 2008/0171556 A1 | 7/2008 | Carter |
| 2010/0227629 A1 | 9/2010 | Cook et al. |

FOREIGN PATENT DOCUMENTS

| | | |
|---|---|---|
| GB | 2445986 A | 7/2008 |
| GB | 2460184 A | 11/2009 |

\* cited by examiner

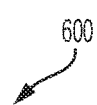

| DATA VARIABLE NAME | DESCRIPTION |
|---|---|
| SSID | BROADCAST SSID FROM THE WiFi ACCESS POINT |
| BSSID | BSSID (MAC ADDRESS) OF THE WiFi ACCESS POINT |
| LATITUDE | LATITUDE OF DEVICE AT THE TIME OF OBSERVATION |
| LONGITUDE | LONGITUDE OF DEVICE AT THE TIME OF OBSERVATION |
| ALTITUDE | ALTITUDE OF DEVICE AT THE TIME OF OBSERVATION |
| verticalAccuracy | ACCURACY OF THE VERTICAL MEASUREMENT |
| horizontalAccuracy | ACCURACY OF THE HORIZONTAL MEASUREMENT |
| RSSI | RSSI (SIGNAL STRENGTH) AT THE TIME OF OBSERVATION, IF AVAILABLE |
| captureData | DATE OF OBSERVATION |

FIG. 6

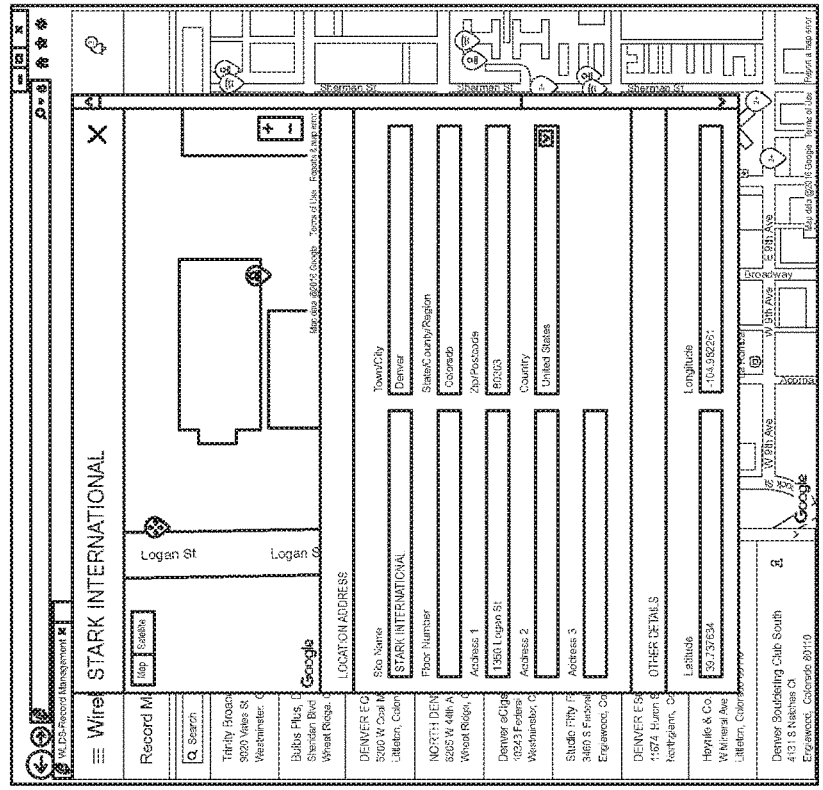
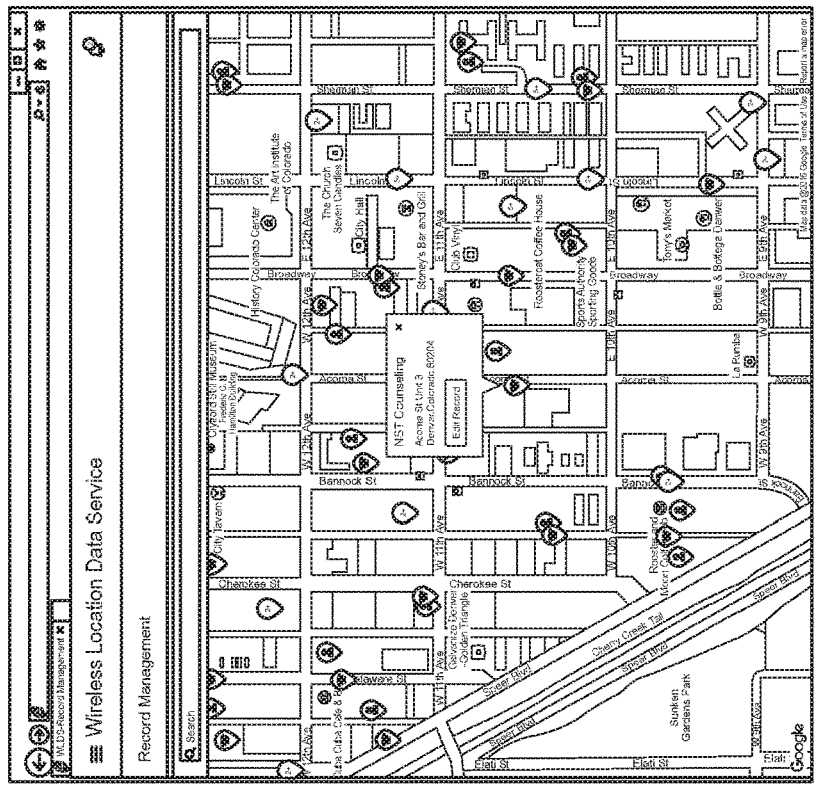
FIG. 10

SYSTEMS AND METHODS FOR BUILDING AND UPDATING A WIRELESS NODE DATABASE SERVICE

CROSS-REFERENCE TO RELATED APPLICATIONS

This application claims the benefit of U.S. Provisional Application No. 62/435,557, filed Dec. 16, 2016, the entire content of which is expressly incorporated herein by reference thereto.

FIELD OF THE INVENTION

The present invention relates to wireless node databases. More particularly, the present invention relates to novel and improved systems and methods for building and updating a wireless node database service and for improving the quality of the data therein.

BACKGROUND OF THE INVENTION

Examples of wireless nodes include but are not limited to Wi-Fi access points, Bluetooth beacons, 3G, 4G and 5G (cellular) nodes. There are literally millions of wireless nodes currently deployed across the globe today controlled by different entities, including service providers, corporates and private individuals. As the number of wireless nodes is very large and continues to grow and the wireless nodes are geographically dispersed and separately operated by different entities, several problems exist. First, it becomes extremely time-consuming and costly to keep an accurate record not only of existing wireless nodes, but also of newly deployed wireless nodes or existing wireless nodes that have been moved to a new location or have been removed entirely. For example, U.S. 2006/0095348 to Jones et al. discloses a method of building a wireless node database by deploying a vehicle equipped with a global positioning system (GPS) device and a wireless radio device to scan every street in a given area. The wireless nodes detected by the vehicle are recorded in a database in conjunction with GPS location information. This method requires an entity to purchase a good number of advance vehicles at a considerable expense and to spend weeks or months in scanning all the areas that are provided with the entity's wireless nodes. The lengthy scanning process has to be repeated once in while in order to receive the most current information.

Second, the updated record may not be immediately available to end users. Within a service provider, the location information of the wireless nodes collected (regardless the manner in which they are collected) may need to be reviewed and corrected to ensure their accuracy. The review and correction process may involve communicating with different individuals of the service provider and sending the document containing the location information and corrections back and forth. It is inevitable that some human errors will occur in dealing a significant amount of data with several persons. Moreover, the data from the service provider may not be available to or in the same format as the data of another service provider as each service provider may have their own protocols. If one provider wishes to incorporate the date from the other provider, the data from the other provider would need to be added into the computer system of the service provider or be modified. Both the addition and modification processes require some time. There is no central platform for a service provider to expediently collect and manage the location data or for service providers to facilitate the commingling of their location data. Furthermore, when the updated record is not available to the end user and the end user relied on the old record to go to an area that he or she expects to have WiFi access but now does not offer such connection, the end user may lose his or her confidence in the service provider's service, and thus affects its reputation and revenue. This adverse consequence is even more severe when the end user is in a roaming area and he or she needs to depend on WiFi access to avoid overcharges.

Third, the current systems and methods are unable to maintain a complete database containing location data of all the service provider's wireless nodes. There are always wires nodes missed by such systems and methods because they cannot reach certain areas containing the wireless nodes or cannot receive a complete list of all the wireless nodes. This deficiency is also often conceded in their marketing materials or technology specifications. Additionally, having a database as complete as possible is critical for providing location-based services, especially in emergency situations. When a 911 call is dialed, information identifying the closest wireless node can be transmitted to the database for comparing and determining if the location information of that node is already in the database. If yes, the location information can be forwarded to a public safety answering point (PSAP) and serve as a dispatchable location. The PSAP can then send the necessary help to that location. If the location information is not available in the database, the PSAP may not know where the call is coming from and where the emergency personnel should report. Moreover, government agencies are starting to impose requirements on service providers to maintain a database with location data for a certain percentage of their wireless nodes (e.g., 95%) and failure to maintain such a database may be penalized.

Accordingly, there is a need for a system and method that solves the shortcomings mentioned above add that is improved over what is currently known in the art. There are also other deficiencies that can be remedied based on illustrative descriptions provided herein.

SUMMARY OF THE INVENTION

In accordance with principles of the invention, a system (e.g., platform), method, or computer readable medium that is provided for providing an improved wireless node database service. For example, a computer-implemented system is implemented for providing a wireless node database service to a plurality of service providers that each owns or operates a set of wireless nodes located in a geographically dispersed area and for maintaining reliable and up-to-date information about the wireless nodes is contemplated. The system may comprise a wireless location data service platform comprising one or more servers and associated software stored in non-transitory memory, wherein the software configures the servers to provide the platform as a service to the plurality of service providers over a network, wherein on the servers, the platform:

communicates and interacts with particular types of external systems including (a) computer terminals of at least some of the service providers, (b) engineering systems managing wireless nodes of one or more of the service providers, (c) maintenance system associated with engineer responsible for installing new wireless nodes or responsible for repairing or replacing existing wireless nodes of the service providers, (d) end-user mobile devices that are subscribed to the service providers' service, and (d) systems of third party service partners whose service is engaged by service providers to maintain wireless node data collected by the service providers or the engineering systems, wherein as part of communications and interactions the platform receives files containing wireless node data from the different types of external systems and each file includes a number of fields and specific type of wireless node data in each field;

harmonizes the wireless node data in the received files that has conflicting information with respect to individual nodes by comparing the wireless node data in the received files to determine inconsistencies in the wireless node data in the received files with respect to individual nodes and providing a user interface for manual review and selection of data or automatic conflict resolution based on a criteria, wherein the data being harmonized is from different types of external systems with respect to the individual nodes;

adds a new wireless node, removes an existing wireless node, or updates an existing node from the set of wireless nodes owned or operated by a particular service provider by identifying a new wireless node or an existing wireless node from wireless node data received from the external systems other than that of the service provider and evaluating whether a threshold amount of reliable information has been received to verify the existence of the new wireless node, the removal of the existing wireless node, or the update of the existing wireless node; and produces updated wireless node data that includes the new wireless node, that is without the removed existing wireless node, or that includes the updated wireless node for a corresponding one of the service providers, wherein the wireless node data is converted to be in a format that is compatible with the external system of the corresponding service provider; and publishes the updated wireless node data so they are available to service providers other than the service provider supplied the data and to other users of the platform.

The platform can further validate the received files by checking whether the number of fields in each file matches to a predetermined number of fields and whether the specific type of wireless node data in each field matches to the type of wireless node data assigned to that field, the file with matching number of fields and matching type of data in all the fields is a validated file.

The platform can further validate the wireless node data in each validated file by checking whether the wireless node data in each validated file includes all fields required by the platform and whether the wireless node data in each field of each validated file is within a range specified by the platform for that field, the wireless node data including all the required fields and data within the specified range is a validated data.

The data being harmonized can be from the validated data.

The wireless node data can comprise geographical location data for identifying the location of the wireless node, identification data for identifying the wireless node, accuracy of the geographical location data, signal strength received from the wireless node, the date the wireless node data was obtained or observed, or a combination thereof.

The geographical location data can include latitude, longitude, and altitude of the wireless node and the identification data includes SSID and BSSID of the wireless node.

The wireless node can be a Wi-Fi access point, a Bluetooth beacon, or a cellular node.

In one embodiment, the platform:

communicates and interacts with particular types of external systems including (a) computer terminals of at least some of the service providers, (b) engineering systems managing wireless nodes of one or more of the service providers, (c) maintenance system associated with engineer responsible for installing new wireless nodes or responsible for repairing or replacing existing wireless nodes of the service providers, (d) end-user mobile devices that are subscribed to the service providers' service, and (d) systems of third party service partners whose service is engaged by service providers to maintain wireless node data collected by the service providers or the engineering systems, wherein as part of communications and interactions the platform receives files containing wireless node data from the different types of external systems and each file includes a number of fields and specific type of wireless node data in each field;

validates the files by checking whether the number of fields in each file matches to a predetermined number of fields and whether the specific type of wireless node data in each field matches to the type of wireless node data assigned to that field, the file with matching number of fields and matching type of data in all the fields is a validated file;

validates the wireless node data in each validated file by checking whether the wireless node data in each validated file includes all fields required by the platform and whether the wireless node data in each field of each validated file is within a range specified by the platform for that field, the wireless node data including all the required fields and data within the specified range is a validated data;

stores validated wireless node data in a wireless node database maintained by the platform;

harmonizes the validated data that has conflicting information with respect to individual nodes by comparing validated data to determine inconsistencies in the validated data with respect to individual nodes and providing a user interface for manual review and selection of data or automatic conflict resolution based on a criteria, wherein the data being harmonized is from different types of external systems with respect to the individual nodes;

adds a new wireless node, removes an existing wireless node, or updates an existing wireless node from the set of wireless nodes owned or operated by a particular service provider by identifying a new wireless node or an existing wireless node from wireless node data received from the external systems other than that of the service provider and evaluating whether a threshold amount of reliable information has been received to verify the existence of the new wireless node, the removal of the existing wireless node, or the update of the existing wireless node; and produces updated wireless node data that includes the new wireless node, that is without the removed existing wireless node, or that includes the updated wireless node for a corresponding one of the service providers, wherein the wireless node data is converted to be in a format that is compatible with the external system of the corresponding service provider; and publishes the updated wireless node data so they are available to service providers other than the service provider supplied the data and to other users of the platform.

A computer-implemented method can be implemented for providing a wireless node database service to a plurality of service providers that each owns or operates a set of wireless nodes located in a geographically dispersed area and for maintaining reliable and up-to-date information about the wireless nodes is also contemplated. The method may comprise:

communicating and interacting with particular types of external systems including (a) computer terminals of at least some of the service providers, (b) engineering systems managing wireless nodes of one or more of the service providers, (c) maintenance system associated with engineer responsible for installing new wireless nodes or responsible for repairing or replacing existing wireless nodes of the service providers, (d) end-user mobile devices that are subscribed to the service providers' service, and (d) systems of third party service partners whose service is engaged by service providers to maintain wireless node data collected by the service providers or the engineering systems, wherein as part of the communications and interactions step, the step includes receiving files containing wireless node data from the different types of external systems and each file includes a number of fields and specific type of wireless node data in each field;

validating the files by checking whether the number of fields in each file matches to a predetermined number of fields and whether the specific type of wireless node data in each field matches to the type of wireless node data assigned to that field, the file with matching number of fields and matching type of data in all the fields is a validated file;

validating the wireless node data in each validated file by checking whether the wireless node data in each validated file includes all fields required by the platform and whether the wireless node data in each field of each validated file is within a range specified by the platform for that field, the wireless node data including all the required fields and data within the specified range is a validated data;

storing validated wireless node data in a wireless node database maintained by the platform;

harmonizing the validated data that has conflicting information with respect to individual nodes by comparing validated data to determine inconsistencies in the validated data with respect to individual nodes and providing a user interface for manual review and selection of data or automatic conflict resolution based on a criteria, wherein the data being harmonized is from different types of external systems with respect to the individual nodes;

adding a new wireless node, removes an existing wireless node, or updates an existing wireless node from the set of wireless nodes owned or operated by a particular service provider by identifying a new wireless node or an existing wireless node from wireless node data received from the external systems other than that of the service provider and evaluating whether a threshold amount of reliable information has been received to verify the existence of the new wireless node, the removal of the existing wireless node, or the update of the existing wireless node; and producing updated wireless node data that includes the new wireless node, that is without the removed existing wireless node, or that includes the updated wireless node for a corresponding one of the service providers, wherein the wireless node data is converted to be in a format that is compatible with the external system of the corresponding service provider; and publishing the updated wireless node data so they are available to service providers other than the service provider supplied the data and to other users of the platform.

It is understood by those of ordinary skill in the art that "communicating and interacting" can include an intermediary device or system for communicating and interacting with the end-user mobile devices or communicating with other external systems. The system or communications can include an intermediary which would be understood to be included in embodiments of the present invention when the platform communicates with other system or sources of data.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 6 depicts illustrative wireless node data obtained by the analytics collector in accordance with some embodiments of the present invention;

FIG. 10 depicts an illustrative user interface provided by the harmonization step in accordance with some embodiments of the present invention.

DETAILED DESCRIPTION OF THE INVENTION

Figure 1:
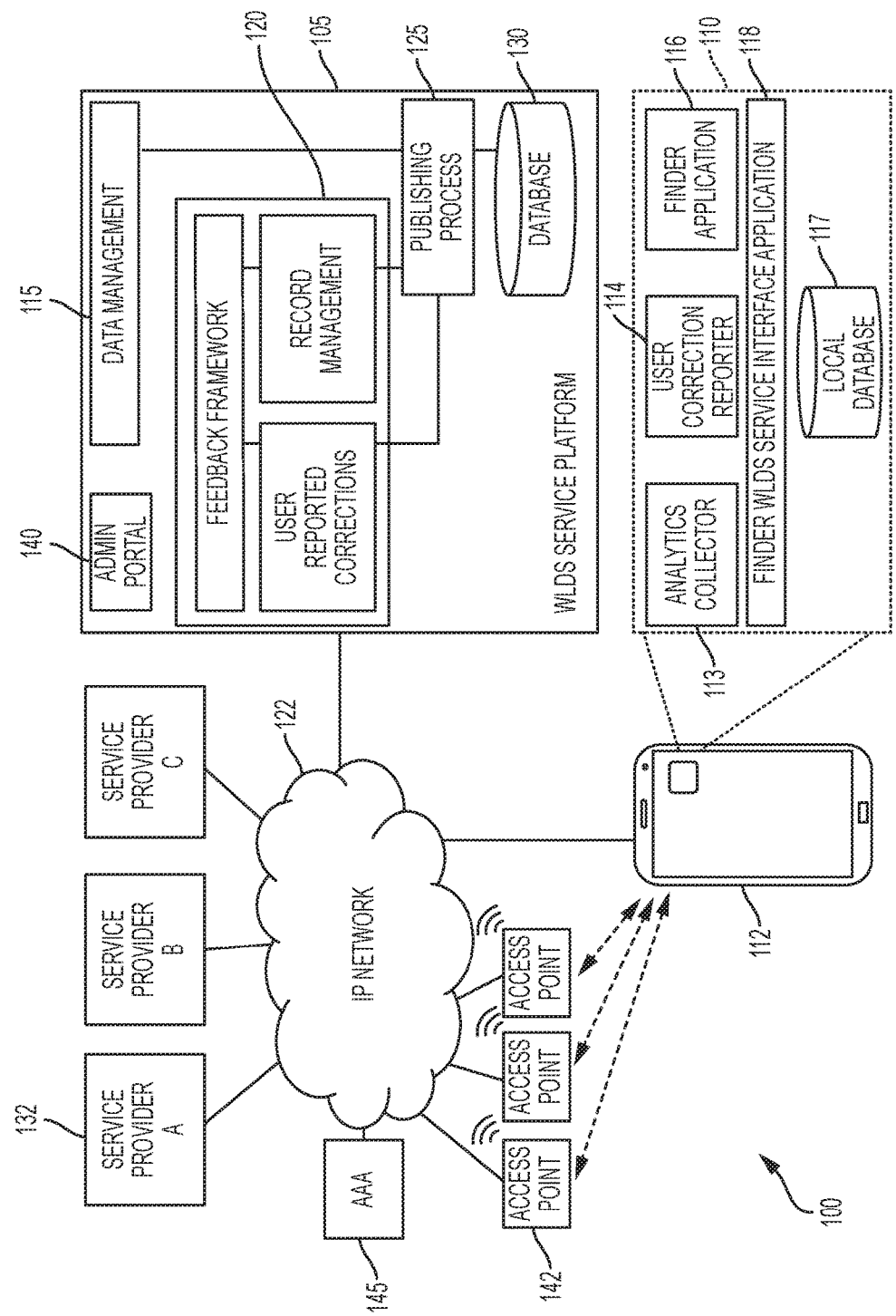
FIG. 1 depicts an illustrative system for building and updating a wireless node database in accordance with some embodiments of the present invention.

Embodiments of the present invention relate to systems and methods for collecting and managing location information of WiFi access points. A service provider, such as T-Mobile, and Time Warner Cable, may operate numerous of WiFi access points that are geographically dispersed and the system and method described herein can help the service provider to collect and manage the location information of all their WiFi access points. The system and method can collect the location information in many different ways. For example, the system and method can collect location information from a file uploaded by the service provider. The system and method can also collect location information from an engineer who is on site to replace or repair an access point, an engineering system that keeps track of the status and location of access points, and/or a third party service partner whose service is engaged to maintain access points and improve accuracy of data collected from access points. The system and method can also collect location information from mobile devices.

Embodiments of the present invention are directed to a system and method for allowing a user to obtain a collection of wireless node data from different sources or particular types of external systems. Particular types refers to different categories of systems with which the system communicates in receiving new or updated wireless node data. The user may be an individual or entity, such as a service provider, a corporation, or a venue owner, who wishes to obtain information about all the wireless nodes operated by that individual or entity. The user may also be an individual or entity who wishes to obtain information about all the wireless nodes operated by other individuals or entities. Such a user can be a government agency who wants to obtain information about all the wireless nodes operated by service providers, corporations, and venue owners in order to provide location-based emergency service. The sources may include service providers, corporations, venue owners, mobile devices (with modules and applications configured to collect wireless node data), systems generating activity logs (e.g., AAA, RADIUS, or Diameter), engineering systems (e.g., inventory management system or ticket system), and third party service partners (who repair or improve the wireless nodes and data of a service provider, corporation, or venue owner). The system and method involves a wireless location data service (WLDS) platform including a data management and a feedback module. The data management is configured to receive wireless node data through importation by a service provider, a corporation, or a venue owner. The feedback module is configured to receive wireless node data from mobile devices, engineering systems, systems generating activity logs, and third party service partners. The system and method also involves an end-user module configured to collect wireless node data and user reported corrections and transmit the collected data and corrections to the platform. A wireless node database in the platform is built and updated from the wireless node data and corrections received from the data management module and the feedback module.

FIG. 1 depicts an illustrative system 100 for building and updating a wireless node database in accordance with some embodiments of the present invention. The system 100 comprises a wireless location data service (WLDS) platform 105 configured to process received wireless node data and a subscriber module 110 configured to collect wireless node data and interact with the platform 105. The platform 105 and the module 110 may be implemented on the same computer system or different computer systems. When the platform 105 and the module 110 are implemented on different computer systems, such as with the platform 105 installed on a server and with the module 110 installed on a mobile device 112, the platform 105 (or the server) and the module 110 (or the mobile device) are connected through a communications network 122. The network 122 may be Internet. The platform 105 includes a data management module 115, a feedback module 120, a publication module 125, a wireless node database 130, and an administration portal 140. The wireless node database 130 stores wireless node data and may be known as a master database. Wireless node data is data that identifies a wireless node. Wireless node data may include geographical location data for identifying the location of the wireless node (e.g., latitude, longitude, and altitude), identification data for identifying the wireless node (e.g., SSID and BSSID), accuracy of the geographical location data (e.g., accuracy or the vertical and horizontal measurement), signal strength (e.g., RSSI), the date the wireless node data was obtained or observed, or a combination thereof. Wireless node data may further include data regarding the site containing wireless node(s) such as the name, address (e.g., postal address), and type (e.g., café, restaurant, or bookstore) of the site, and the connection type that connects the wireless node and the mobile device (e.g., WiFi, Bluetooth, or cellular). Wireless node data may refer the collective data for a group of wireless nodes or the data for an individual wireless node. The wireless node database 130 may be divided into several sub-databases corresponding to different geographic areas such as regions of a country or to metropolitan areas and containing wireless node data of that area. The module 110 includes an analytics collector 113, a user correction reporter 114, a finder application 116, a finder WLDS interface application 118, and a local database 117. The local database 117 derives its data from the wireless node database 130 and is a replica of the wireless node database 130. The local database 117 may be known as replica database. However, it is understood that the module 110 may not include the local database 117 but may instead query and receive data from the wireless node database 130 directly. Service providers 132 can access the platform 105 from their computer terminals that are connected to the platform 105 through the network 122. Each service provider 132 operates one or more wireless nodes 142. Although FIG. 1 shows only the service providers 132 and the wireless nodes 142 operated by the service providers 132, they may also include corporations and the wireless nodes controlled by the corporations, venues and the wireless nodes controlled by the venue owners, and other entities and the wireless nodes controlled by the other entities. The application 118 controls the connectivity of the module 110 to the platform 105 and the operation of the collector 113, the reporter 114, the application 115, and the local database 117. The application 118 interworks with the platform 105 and sets up a communications session with the platform 105 via the network 122. During the session, data can be sent between the module and the platform (e.g., between the reporter 114 and the feedback module 120, between the local database 117 and the wireless node database 130, etc.). The module 110 is supplied to subscribers or customers of the service provider.

The wireless nodes 142 are connected to the network 122 and allow mobile devices to access the Internet. The wireless nodes 142 implement a communications protocol through which the mobile device 112 can communicate with the wireless nodes 142 and another communications protocol to communicate with the network 122. The protocol can be an IEEE 802.11 wireless communications standard (examples include variants of the 802.11 standard such as IEEE 802.11a, IEEE 802.11b, IEEE 802.11g), an IEEE 802.16 wireless communication standard (examples include variants of the 802.16 standard such as IEEE 802. 16a, IEEE 802. 16b, IEEE 802. 16g), an IEEE 802.15.1 wireless communication standard (examples include variants of the 802.15.1 standard such as IEEE 802.15.1-2002, IEEE 802.15.1-2005, Bluetooth 5), or a cellular protocol (examples include GSM, GSM plus EDGE, CDMA). The wireless nodes 142 includes the appropriate interface (e.g., radio interface) to establish these communications. The wireless nodes 142 can include access points (e.g., Wi-Fi hotspots), beacons (e.g., Bluetooth low energy beacons), cellular nodes (e.g., 3G, 4G, and 5G nodes), or other network access nodes. The wireless nodes 142 are geographically dispersed. Each wireless node 142 is fixed to a location and broadcasts a signal containing wireless node data. The wireless nodes 142 are owned or operated by the service providers 132 as a commercial wireless communications service (e.g., for a fee, as part of an existing subscription, or for free as part of a local amenity offered to customers of a business).

The mobile device 112 can scan the area in the vicinity of the mobile device 112 and detect any broadcast signal being broadcasted by a wireless node in the vicinity of the mobile device 112 (e.g., through the finder application of the module 110). The mobile device 112 can capture a broadcast signal and derive wireless node data in the signal that identifies the wireless node that broadcasted the signal (e.g., through the analytics collector of the module 110). The finder application and the analytics collector may operate off-line, i.e., without the need for the mobile device to login to a wireless node and/or for the application 118 to report to the platform 105 when the mobile device is logged to a wireless node. The mobile device 112 can save the derived data in a database 117 of the module 110 or the mobile device 112 that can uploaded to the wireless node database 130 of the platform 105. The upload can occur on a regular basis, irregular basis, or only when instructed by the mobile device user. The database 117 or the database 130 does not need to include the wireless node data in the broadcasted signal in order for the mobile device 112 to identify the wireless node that broadcasted the signal. The mobile device 112 can connect to the Internet via the broadcasted signal or another signal broadcasted by the wireless node that is dedicated to establish Internet connection. The mobile device 112 includes the appropriate interface to communicate with the wireless node (e.g., WiFi interface if the node is a WiFi access point).

Access to the network 122 via the wireless nodes 142 may be available only to authorized individuals or mobile devices. Each service provider 132 may have a remote authentication server or may engage the service of a third party authentication server 145 to perform an authentication procedure that determines whether or not the individuals or mobile devices are authorized to access the network 122 via its wireless node. The server 145 is connected to the service provider's wireless nodes through the network 122, and the wireless node can transmit credentials provided by the user of the mobile device attempting to gain network access to the server 145 allowing the server 145 to perform the procedure based on the provided credentials. The result of the procedure is transmitted to the wireless node. When the procedure result indicates that the individual or mobile device is authorized, the wireless node permits the individual or mobile device to have network access. The authentication server 145 may be a Remote Authentication Dial-In User Service (RADIUS) server or an Authentication, Authorization, and Accounting AAA server.

The authentication server 145 may provide data including when a wireless node was used (e.g., the date and time) and usage frequency of a wireless node (e.g., the number of Internet connections established by a wireless node including the connections for the same and different mobile devices). This data can indicate the service availability of a wireless node such as whether a wireless node has some operation issue because it is rarely accepting connections. This data may be included in a file or the data from any of the external systems or be provided to the platform 105 to supplement the file or data from the external systems.

When the mobile device 112 is in an area where wireless nodes are not available, either wireless nodes do not exist in that area or the mobile device 112 cannot access any wireless node in that area, network access may be provided through the cellular communication function built into the mobile device, such as a cellular radio interface configured to establish 3G or 4G telecommunication connection.

The method for building and updating a wireless node database will now be described in relation to the system 100. Additional functionality of each component in FIG. 1 will also be discussed.

Figure 2:
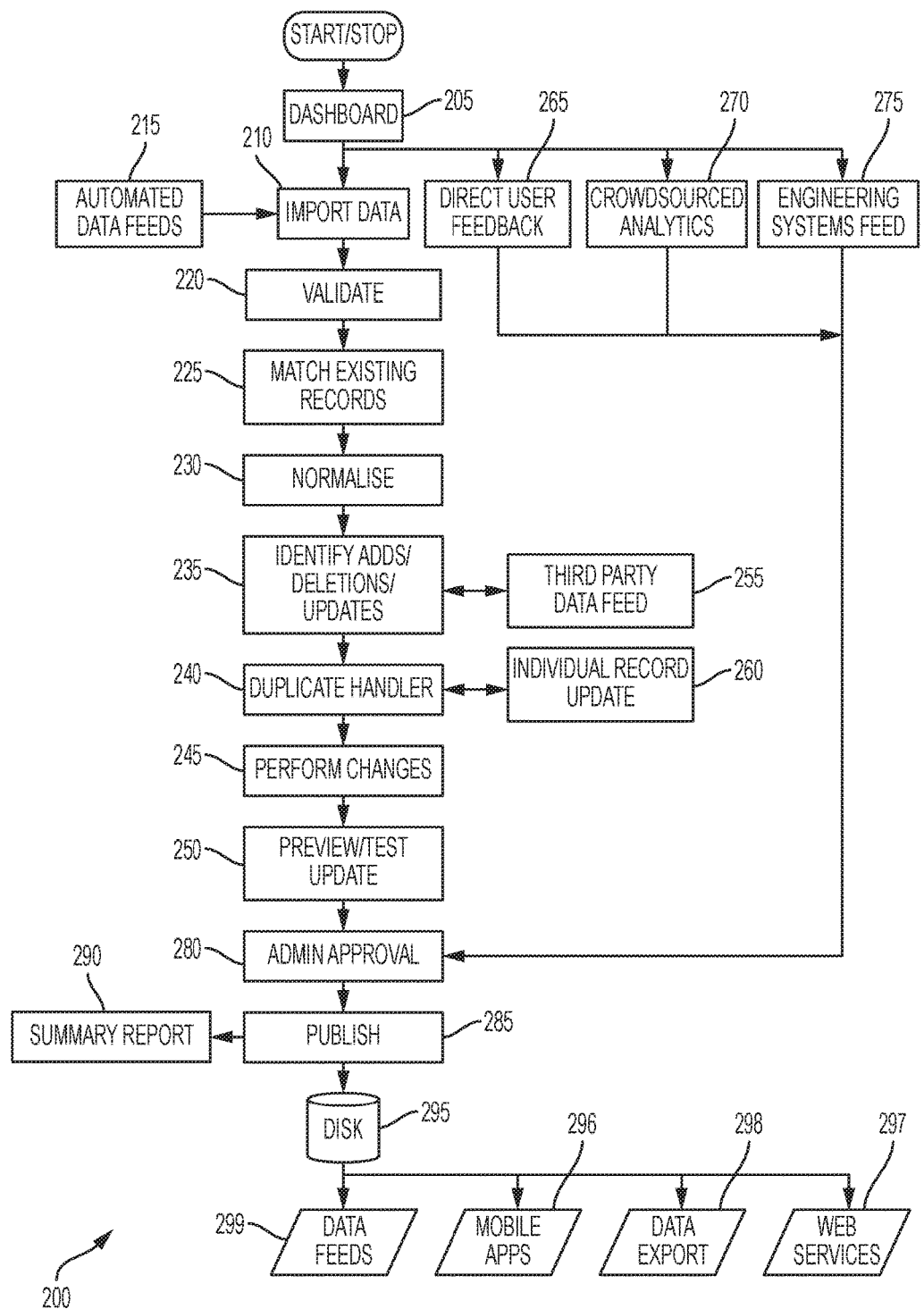
FIG. 2 depicts an overview of an illustrative method for building and updating a wireless node database in accordance with some embodiments of the present invention.

FIG. 2 depicts an overview of an illustrative method 200 for building and updating a wireless node database in accordance with some embodiments of the present invention. The method starts with initiating 205 a dashboard. The dashboard allows service providers or users of the system 100 to import or enter 210 wireless node data and view information provided by the system 100. The information may include an overview of the results generated as a consequence of performing the steps in the method 200. The information may include summary statistics, notifications, alerts, and a list of available reports, all of which are pertinent to the wireless nodes operated by the service provider. Notification and alerts are directly linked to the wireless node data in question to allow swift review or action. Notification may be generated from an update by a third party that added, removed, or modified a wireless node dataset (e.g., after a geocoding exercise). Alerts may be generated from the rejection of a wireless node dataset at a review phase. Reports may be monthly activity reports that provide an overview of the action carried out and by whom within the calendar month. Users of the system 100 may also search a database for a location to find a particular wireless node or its data from the dashboard. The dashboard also provides access to the main functions of the system 100 such as data management, record management, user feedback, analytics, reporting, and user account management (e.g., through a slide menu). The dashboard and its functions are provided by the administration portal 140.

The imported data is received and processed by the data management module. The process includes a validation step 220, a matching step 225, a normalization step 230, a change identification step 235, 240, a change performing step 245, and an update previewing step 250. Dataset or part of dataset in the change identification step 235, 240 may be available to a third party service partner for repair or improvement. Repairs and improvements may include address verification, geocoding, reverse geocoding or other services. The dataset is exported to the third party service partner in a specified format and the repaired or improved dataset is received from the third party service partner in a specified format. The format is specified by a predefined schedule. The change identification step 235, 240 includes a duplicate handler 240 that may be optional and is executed only when a duplicate of a wireless node data is identified (e.g., a wireless node data in the imported data is already in the wireless node database 130). Each identified duplicate is resolved individually 260 such as by keeping the wireless node data in the database 130 and ignoring or deleting the wireless node data in the imported data or by saving the wireless node data in the imported data as a new record in the database 130. Each identified duplicate may also be used to check if the wireless node data in the database 130 is current or correct and to update the wireless node data in the database 130 if necessary.

In addition to receiving data through importation, the platform 105 may also receive wireless node data from the mobile device user through the user correct reporter 265 (or 114, FIG. 1), the analytics collector 270 (or 113, FIG. 1), a tool 275 (e.g., a mobile app provided by the platform provider) used by an engineer to report on installations and repairs (e.g., a barcode scanner, the engineer's mobile device, or an engineer application installed on his or her mobile device), and a service provider's engineering system 215 (such as a system used by the service provider to collect, maintain, or store all of its wireless node data). Examples of an engineering system 215 include inventory management system, ticket system, or other system that can provide updates on equipment added, moved, and changed. The engineering system 215 can be configured to feed its data automatically into the platform 105. The imported data 210 is fed to the data management module 115 and is processed by that module (e.g., go through steps 220-250). The user reported correction 265 is fed to the feedback module 120 and is processed by that module. The data 260 from the analytics collector 113 and the data from the engineering system may also be fed to the data management module 115 and be processed by that module (not shown in FIG. 2). The user reported correction 265 may also be fed to the data management module 115 and be processed by that module (not shown in FIG. 2). The feedback module 120 may also perform steps similar to the data management module 115 to process the user reported correction 265.

Each data received (where it is from step 210, 215, 265, 270, or 275) is subject to approval by an administrator. The administrator is a person who can publish 285 received data or data processed by the data management module 115. The administrator may be an employee of a service provider who can approve 285 data imported by another employee or data received from other sources (through the feedback module). The administrator may also be a third party that provides the service of the system/method 100, 200 to the service provider. Publication 285 produces a summary report 290 that may include all the changes made to the wireless node database and saves 295 all the changes made to in the wireless node database (or updates the wireless node database accordingly). The data in the wireless node database is available for access by mobile apps 296 and web services 297, for export 298 (e.g., produced as a file that can opened on any computer system), and for any other uses 299.

Figure 3A:
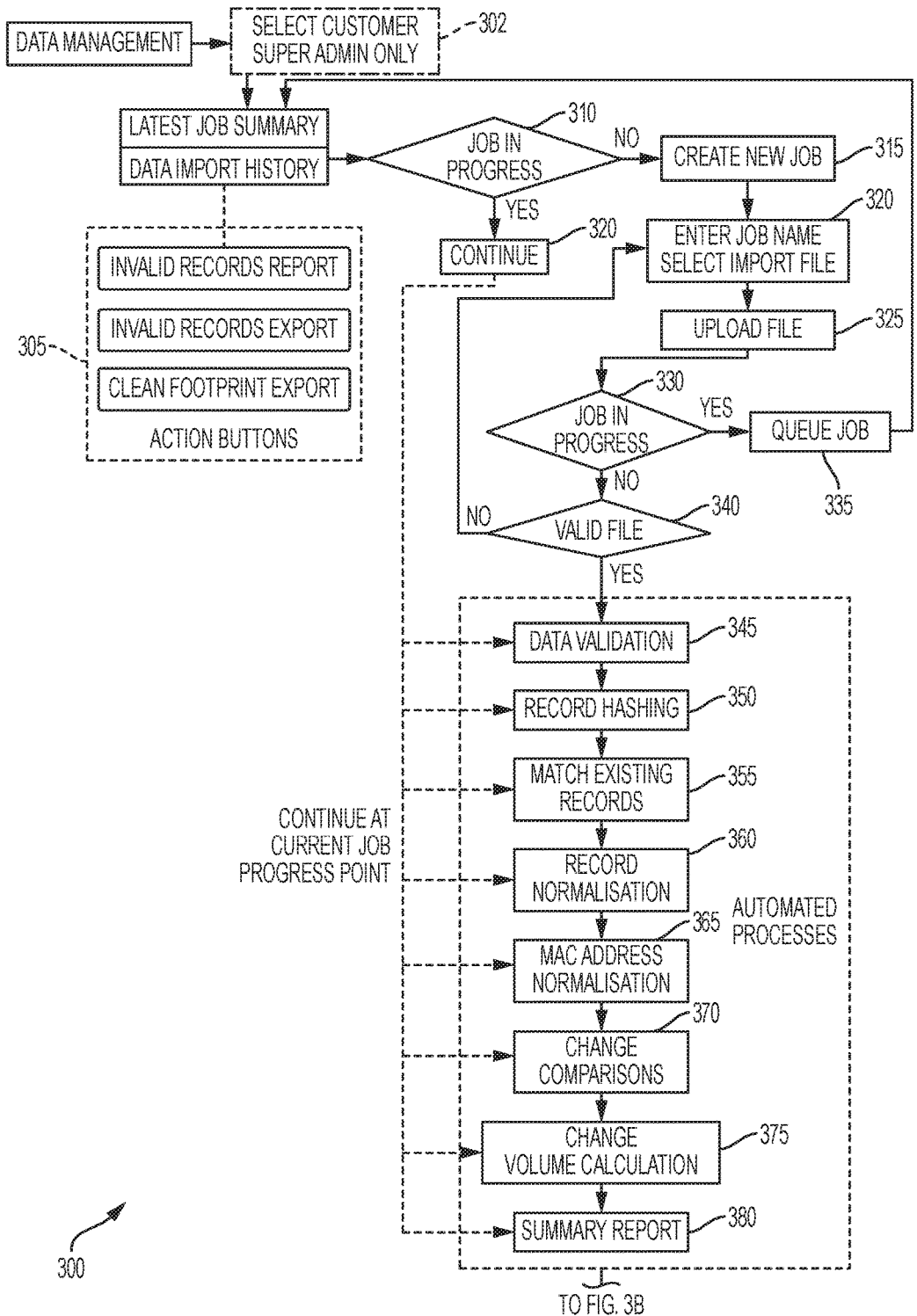
FIGS. 3A-3B depict an illustrative process for receiving and processing imported data through the data management module in accordance with some embodiments of the present invention.
Figure 3B:
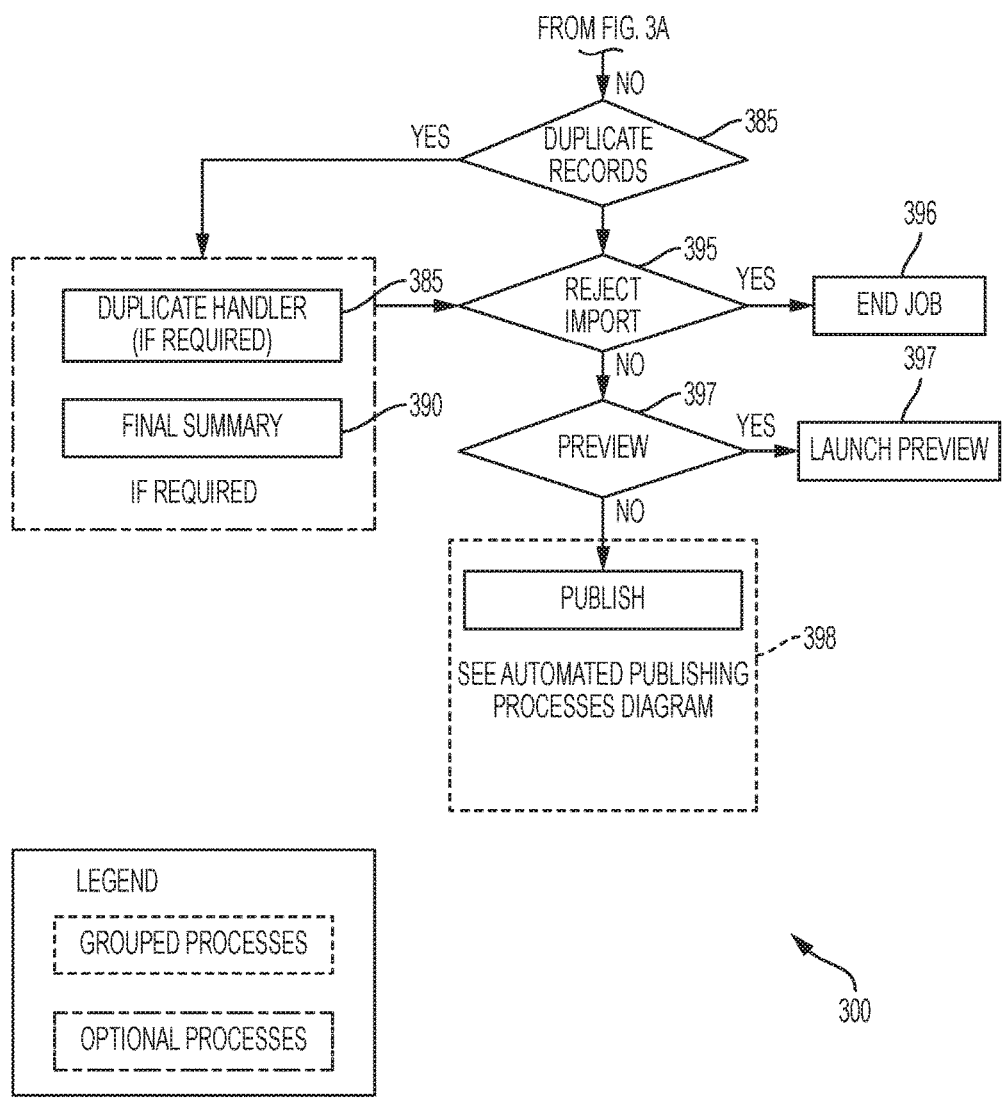

FIGS. 3A-3B depict an illustrative process 300 for receiving and processing imported data through the data management module in accordance with some embodiments of the present invention. The data management functionality is accessed from the dashboard. Data importation may be a function provided by the data management module. The process 300 starts with displaying 305 an import queue screen that offers the service provider the option 310 to start 315 a new import or add an import to the processing queue 310 (e.g., there are wireless node data currently being processed and the data in the added import will be processed after the current process finishes). The import queue screen also provides the status of the data currently being processed, the imported data waiting to be processed, a summary of the latest import and processing result, and a history of data import and processing results. Depending on the information the service provider is viewing, several associated or context-sensitive commands/buttons are presented to the service provider for activating additional functions. These commands may include a command to continue with current processing (and processing of import in the queue), a command to cancel current processing (or processing of import in the queue), and option to export reports, etc. The administrator may be provided with an optional command 302 allowing him or her to search a list of service providers and select a particular service provider to view or access any information or function that is available to that particular service provider.

After selecting the option to start a new import or add an import to the processing queue, the service provider enters a name for the job for identification purposes and may select a file to import either by way of browsing the local file system or dragging a file into the import queue screen or other screen provided by the data management module from another window in the operating system. Job refers to a task to be completed by the data management module or all the wireless node data in the file to be processed by the data management module. If there are no other jobs in the import queue, the data management module will start processing 330 the job after uploading 325 the file to the platform or the server on which the platform is implemented. If there is a job currently being processed, the job will be put 335 in the processing queue waiting for its turn to be processed.

The uploaded file includes a number of fields and a specific type of data in each field containing wireless node information. The process starts with a file validation step 340 that validates the uploaded file by checking if the number of fields matches to a predetermined number of fields and if the specific type of data in each field matches to the type of data assigned to that field. The number of fields may be predetermined by the administrator or the service provider and input into the platform. The type of data associated with each field may also be assigned and inputted by the administrator or service provider. If there is a mismatch in the number of fields or in the type of data (or either condition is not met), the file is rejected and no further processing occurs. The service provider is notified. Once the file is validated (or meets both conditions), the data contained in the file is loaded into a working database table in which further steps are applied. The platform or data management module is capable of ingesting wireless node data from different service providers or sources that may store those information in different formats. When the predetermined number of fields and the assigned type of data are provided by the administrator, the file validation step 340 makes all the files uniform. When the predetermined number of fields and the assigned type of data assigned are provided by the service provider, the file validation step 340 can check if the employee uploaded the correct file or entered the correct type of data in the field if the uploaded file is a correct file.

The imported file may include a header row containing information on the number of fields and the specific type of data that is in each field and this feature may be used by the process to perform the checks. The header row may contain other information that can be used to validate the file, such as the order of the fields. Step 340 can validate the file based one of these information or a combination of two or more of these information.

Once the file validation step 340 is complete, the process proceeds to a data validation step 345. Step 345 validates the wireless node data in the working database table by checking if all the fields required by the data management module are present in that data and if the data in each field (e.g., latitude and longitude) is within a range specified by the data management module for that field. When the wireless node data does not have all the required fields or the data in a field is outside the specified range, the wireless node data (or the wireless node corresponding to that data) or the field is marked. The wireless node data may include data for one wireless node or data for a plurality of wireless nodes. When the wireless node data includes data for a plurality of wireless nodes and the data of a wireless node does not have all the required fields or one of the fields has data outside of the specified range, that wireless node or field is marked. Once the wireless node or field is marked, step 345 continues for the remaining wireless nodes in the wireless node data. Step 345 is performed on the entire wireless node data in the working database table or all the wireless nodes in that data. At the end of step 345, the service provider is notified of how many data or wireless nodes or how many fields had passed and/or failed the data validation step. The notification may be provided through a summary report. Each wireless node or the data for each wireless node in the wireless node data may be referred to as a record. The wireless node data is also checked against a list of known profanities as part of step 345.

Once the data validation step 345 is complete, the process proceeds to a record hashing step 350 and a matching step 355. Steps 350, 355 hashes wireless node data that passed the data validation step 345 into individual wireless node data for each wireless node (or record), compare each record with the wireless node information in the wireless node database to determine if each record exists in the wireless node database, and identify records that exist in the wireless node database and records that are not stored in the wireless node database. The wireless node information may be all the wireless node data of a particular service provider or the service provider that imported the file. The wireless node information may be information that is already published. In the step of comparing, it may include comparing normalized MAC address field, latitude field, and longitude field in each individual wireless node information with normalized MAC address field, latitude field, and longitude field in the wireless node information stored in the wireless node database. The wireless node information stored in the wireless node database may include a service provider identifier identifying the service provider that operates the wireless node. If a match is found, the identifier of the service provider that operates the wireless node may be written into the working table. These steps allows changes between existing data and newly imported records to be identified more quickly.

The record hashing step 350 may also refer to a step comprising performing a checksum step for a set or all of the fields in the wireless node data that passed the data validation step 345 to obtain a checksum and comparing the obtained checksum with a checksum for the same fields for the matching wireless node data. If there is a difference in checksum, the step may further comprise determining the fields that are different and evaluating the extent of the difference to determine whether or not the difference warrants an update of the fields for the matching wireless node data (e.g., is it negligible or sufficient for updating the fields?). If there is a sufficient difference, the step continues with allowing the fields to be updated such as by a manual or automated process.

Once the record hashing step 350 and the matching step 355 are complete, the process proceeds to a record normalization step 360. Step 360 normalizes each field in each record that does not exist in the wireless node database according to a set of rules. The rules may be determined by the administrator and input into the platform, such as rules for correcting spelling or typographical errors and rules for abbreviating postal addresses. For example, step 360 can correct misspelling such as "raod" and reduce "boulevard" to "blvd" This step allows wireless node data from different service providers to be matched more effectively. The rules may be applied to specific countries only if needed. A MAC address normalization step 365 is performed after step 360 that ensures all the MAC addresses from each record are stored in the same format. For example, step 365 can normalize a field in a record that specifies a MAC address of the wireless node associated with that record. Step 365 is purely a formatting change and no replacement to the MAC address or other data is made. Step 365 may also be part of step 360.

Once the normalization steps 360, 365 are complete, the process proceeds to a change comparisons step 370. Step 370 is another step performed to match records that do not exist in the wireless node database with the wireless node information in the wireless node database. This stage aims to match newly imported sites with existing sites already in production data, which are associated with connections from other service provider. The aim is to retain a single location record containing definitive name and address data for that location. The matching of records is based on the matching of normalized address fields together with latitude and longitude fields. If a direct match is found, they are flagged and added to the duplicate list for further manual identification in the duplicate handler later in the process. This stage also determines which records have a different hash value from the currently published records and therefore must be updated. This is based on a string comparison of the hashes calculated in previous stages.

The system is configured to retain data in database when a node has been determined to be removed from the list based, for example on the service provider removing the node from its list or analytics indicating the node is not at that location. Retaining the data permits the later reuse of the data if the same provider or somebody else establishes that node again.

Once the change comparisons steps 370 is complete, the process proceeds to a change volume calculation step 375. Step 375 computes the number of different operations which must be applied to the current wireless node information in the wireless node database (or the currently published data) to include the new records without duplicates. Step 375 also determines the number of records new to the wireless node database, the number of new records to be saved in the wireless node database, the number of new records to be delivered to the mobile device (or customers of the service provider), the number of records to be deactivated, reactivated, and activated (described below in the publication step), and generates a summary report 380 containing these results.

Once the change volume calculation step 375, the process may proceed to a duplicates handling step 380 (performed by a duplicates handler or a duplicates handling system). Step 380 is optional, and is executed only when there is a duplicate identified in steps 350, 355. A duplicate is a record that already exists in the wireless node database. A duplicate may also be a record that matches to the location of a wireless node stored in the wireless node database. Step 380 may produce a screen displaying each duplicate and the number of duplicates. Each displayed record may be expanded to view additional options. The duplicates can be resolved by saving the duplicates as new records in the wireless node database without modifying or deleting the data of the matched wireless nodes in the wireless node database, keeping the data of the matched wireless nodes and deleting the duplicates, or updating the data of the matched wireless nodes with the duplicates. If the update option is selected, the existing record can be deleted and replaced with the duplicate. The existing record can also be modified using the information contained in the duplicate without being deleted. Step 380 is skipped when no duplicate is identified.

Once the duplicates handling step 380 or the change comparisons step 370 is complete, the process generates 390 a final summary report detailing the changes that will be applied to the wireless node database or the published wireless node data by the service provider. The changes may include new wireless node data added, wireless node data updated, and/or wireless node data deleted. The final summary report gives the service provider another chance to check the changes and edit the changes prior to their publication. The employee of the service provider who imported the data can reject 395 the imported data for any reason so that none of the data in the wireless node data is changed, request approval from the administrator or someone with higher authority to check or verify the imported data, or publish the imported data directly if the employee is authorized to perform such action. The process 300 ends 396 after the employee rejects, requests approval for, or publishes the imported data.

Once the final summary report is generated, a preview functionality 397 can be invoked. Preview 397 allows the service provider to view the wireless node data imported on a map. The service provider can see where the imported wireless nodes are located. Preview 397 also allows the service provider to search a particular wireless node data or a particular wireless node imported. The search can include a filtering function that filters the imported data based on site type and allows the service provider to view the imported data based on site type. Preview 397 helps identify errors in the latitude and longitude (e.g., inverted values or missing a negative sign) and other data. Preview 397 can be provided in a screen or a new browser tab separate from the screen or browser tab showing the final summary report. The service provider can close this screen or tab to return to the final summary report for further actions such as to reject or publish 398 the imported data.

Figure 4:
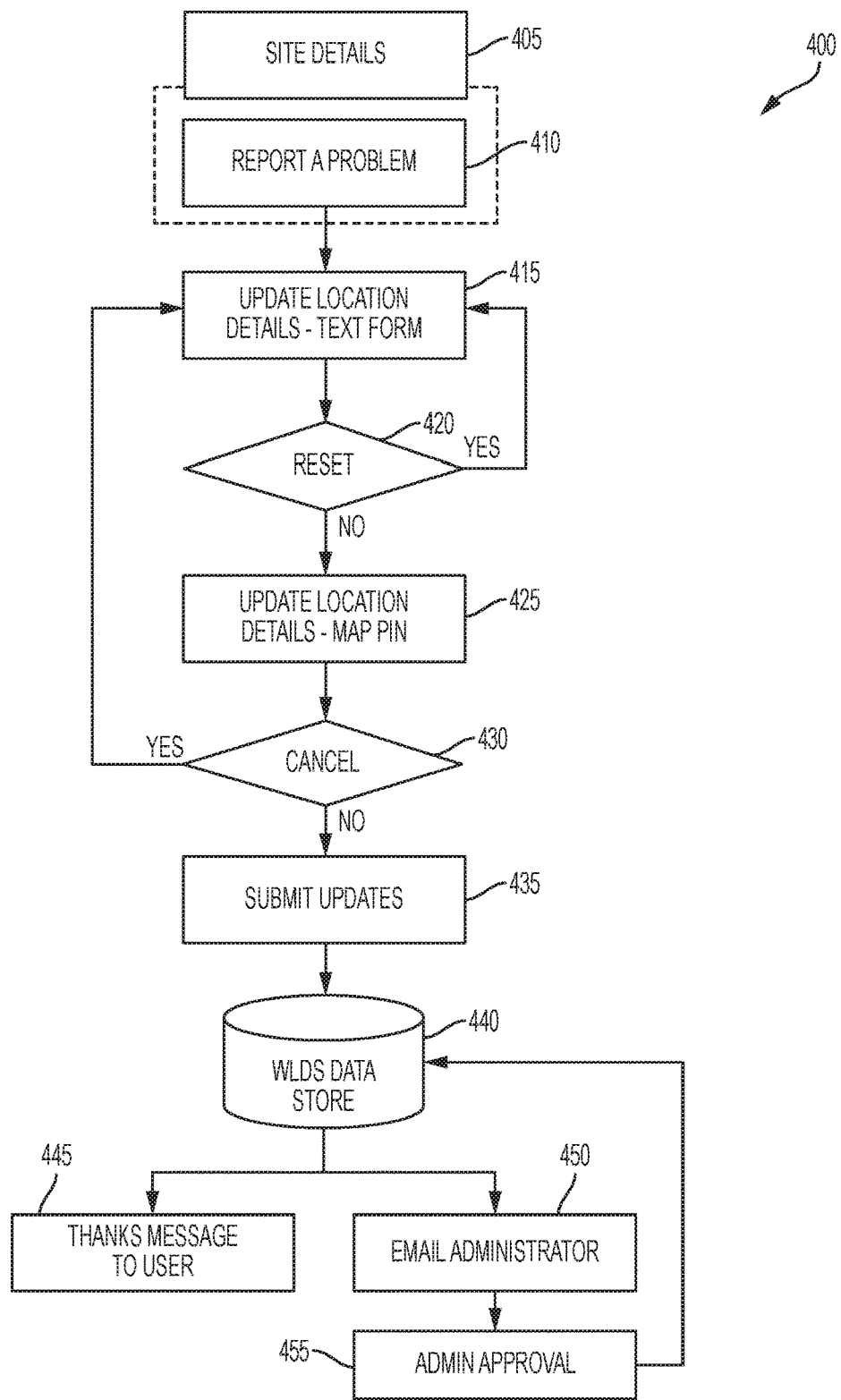
FIG. 4 depicts an illustrative process for receiving and processing user reported data through the feedback module in accordance with some embodiments of the present invention.

In addition to the data management module, the platform may also receive wireless node data from the feedback module. The feedback module allows mobile device user, engineer, and mobile device to supply wireless node data to the platform (whereas the data management module allows service provider to provide similar information). Discussion will start with the manner in which mobile device user supplies wireless node data to the platform. FIG. 4 depicts an illustrative process 400 for receiving and processing user reported data through the feedback module in accordance with some embodiments of the present invention. "User" described in relation to FIG. 4 refers to mobile device user or mobile device user who is subscribed to the service provider's telecommunication service. The user can update the wireless node data in the wireless node database through the user correction reporter 114 that transmits the user-entered information to the feedback module 120. The process 400 can start with the user selecting a site containing one or more wireless nodes from a menu provided by the reporter 114. The reporter 114 can retrieve wireless node data (which includes information regarding the site containing wireless node(s)) stored in the wireless node database 130 and make the site available in the menu for the user's selection. After selecting the site, details of the site are shown 405 to the user. The details can include the name, type, telephone number, location (e.g., postal address), and location coordinates of the venue. If there is any incorrect information, the user can activate 400 a "report a problem" command or similar command to correct the information. The correction procedure starts with a step allowing the user to make textual change 415 such as changing the name of the site from "McDonald's" to "Starbucks" and the type of the site from "cafe" to "restaurant." The activation of the "report a problem" command opens a form containing currently held text details retrieved from the wireless node database that may be overwritten. Once the correct information is provided, the reporter 114 asks if the changes should be accepted or reset 420. If the changes are not accepted or are reset 420 by the user, such as because there are typographically errors or the user entered the wrong information, the user can reenter 415 the correct information. Reset removes all the currently held text details from the form. If the changes are accepted or not reset 420 by the user, the correction procedure continues to a step allowing the user to make geographical map change 425 such as moving a pin associated with the site on a geographical map to another location on the geographical map. The geographical map and the pin are displayed for making changes after the user updates the textual information. While or after making geographical map change, the user can cancel all the changes he or she has made and start the correction procedure from the beginning (e.g., step 415). Once the user enters all the changes to the reporter 114, the reporter submits 435 the updates to the feedback module 120. A copy of the updates can be saved in the local database 117. Steps 405-435 are all performed by or through the reporter 114. Once transmitted, the updates are saved 440 in the wireless node database 130 without being published. A message, such as a thank you message, is generated and sent 445 to the user notifying him or her that the updates are submitted and are waiting for the administrator's approval for publication. A message, such as a new update has been submitted message, is generated and sent 450 to the administrator notifying him or her that there are updates requiring his or her approval. The administrator can then verify and approve or disapprove 455 the updates for publication.

Figure 5:
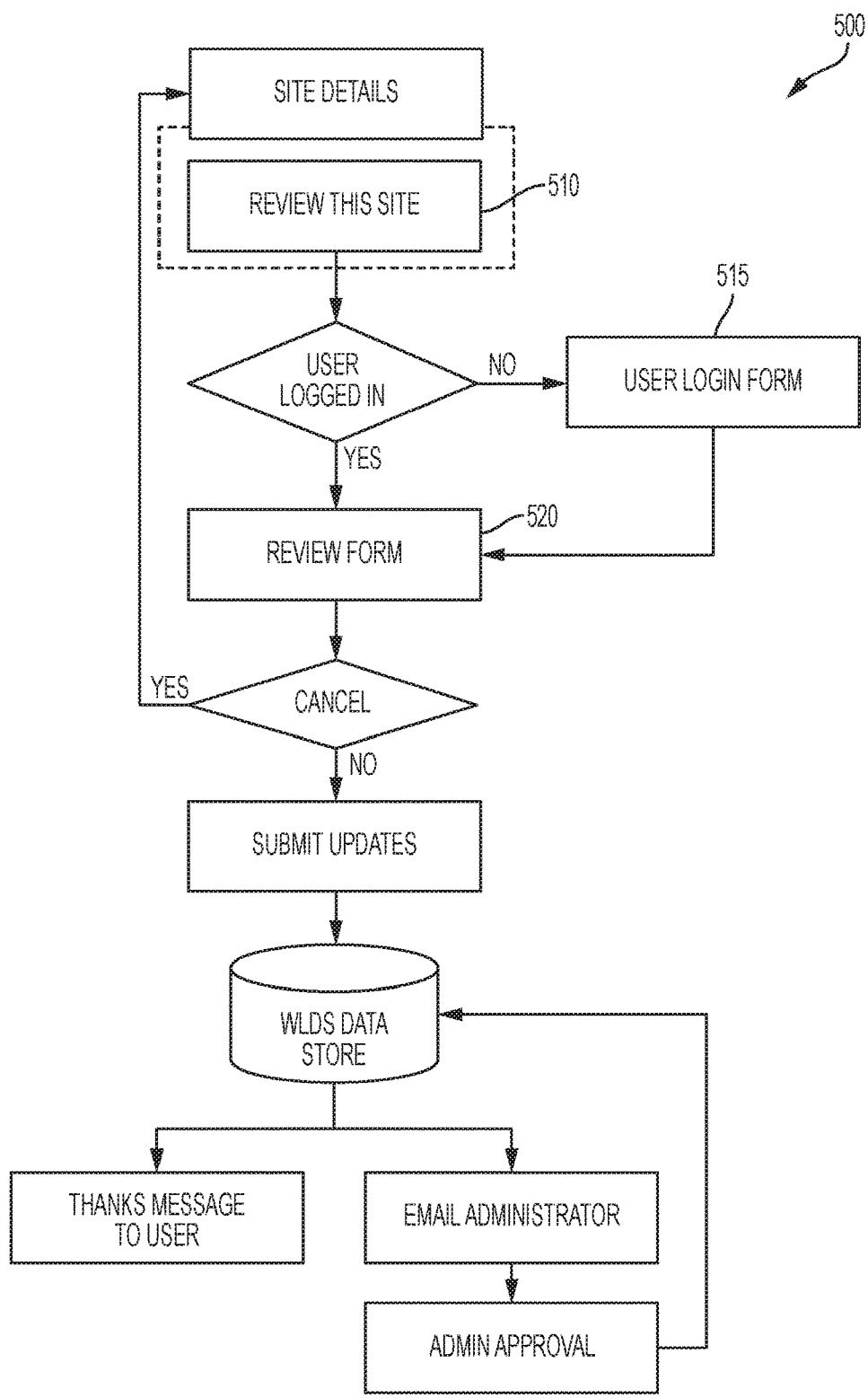
FIG. 5 depicts an illustrative process for submitting reviews of the site in accordance with some embodiments of the present invention.

The user can also submit reviews on the quality of the connection provided by the site from the reporter 114. FIG. 5 depicts such a process 500. The process 500 is similar to the process 400 except that the process 500 involves activating a "review this site" command 510 or similar command. Review submission is only available to authorized subscribers of the service provider, and a window asking for username and password is generated 515 upon activating the command if the user is not yet logged in. If the user is already logged in, a review form is provided 520 to the user allowing him or her to input review. The log-in procedure can occur in any process or step to distinguish subscribers of the service provider who can submit reviews and subscribers of the service provider who cannot submit reviews. The review is then transmitted to the platform 105 for the administrator's review and approval and are published once it is approved. Ratings, such as on a scale of one star to five starts, can also be submitted. Ratings from users can be aggregated and averaged to produce an overall rating that may also be published.

The functionality of the reporter 114 may also be available through a web portal that allows the user to input updates directly into the platform 105. In that case, a user correction reporter can be built into the feedback module 120 and the web portal can be linked to that reporter. As such, the user can provide updates from any computer system.

Discussion will now be directed to the manner in which engineer supplies wireless node data to the platform. An engineering application may be provided in the platform 105 and module 110. The application operates similar to the user correction reporter 114 but is tailored to engineer's use. In addition to the mobile device, a barcode reader may be supplied to the engineer to allow wireless node data entry faster and more accurate. The barcode reader is connected to the platform through the network 122. The barcode reader and the mobile device may also be built as a single device. The engineer may also provide wireless node data through a web portable as discussed above but is dedicated for engineer's use.

In one embodiment, the engineer may use the engineering application as follows. The engineer arrives at a location to install a new wireless node or replace a faulty equipment. The engineer can log this job using the engineering application on his mobile device or through the web portal using any computer system available on the site. For new installation, the engineer can scan the barcode of the new wireless node and a lookup is performed by the engineering application in real-time with the wireless node database to confirm that the new wireless node is not already in the database (e.g., if it has been swapped from a different location). After confirmation, the engineering application presents an empty form to the engineer and the engineer can complete the form with the necessary information, such as hardware and location information including location coordinates obtained from the GPS of the new wireless node or the engineering's mobile device. The necessary information may further include details of local site principal (e.g., coffee shop owner) so he or she can later update the wireless node data of the new wireless node on the platform. If the information includes the principal's information, the principal may be sent with a notification containing the data entered by the engineer, together with an interim password with which he or she can log into the platform to update or validate the entered data. Update or validation by the principal may be optional. After the engineer completes the necessary information or the principal updates or validates the entered data, the complete information or updated/validated information is submitted to the platform for administrator's review and approval. Once the administrator approves the information for publication, the platform generates a message notifying the principal that the new wireless node is saved in the wireless node database and is published.

For equipment replacement, the engineer can similarly scan the barcode of the faulty equipment and a lookup is performed by the engineering application in real-time with the wireless node database to retrieve information for that equipment. A pre-populated form is then generated with the information gathered from the wireless node database. The engineer can modify the information in the form and add any additional information if necessary (e.g., details of the local site principal if those information are not already on the form). After the modification and/or the addition, the principal may be sent with a notification containing all the data on the form (including those modified and added by the engineer), together with an interim password with which he or she can log into the platform to update or validate the modified data, the added data, and any other data on the form. Update or validation by the principal may be optional. After the engineer modifies and/or adds more information or the principal updates or validates those data, all the information are submitted to the platform for administrator's review and approval. Once the administrator approves the information for publication, the platform generates a message notifying the principal that the modified and/or added information is saved and updated in the wireless node database and is published. Engineer can include any professional who can install or repair a wireless node.

Discussion will now be directed to the manner in which mobile device supplies wireless node data to the platform. The module 110 (FIG. 2) includes an analytics collector 113 configured to perform such functionality. The mobile device 112 can constantly make sweep of the area in the vicinity of the mobile device 112 and detect any broadcast signal being broadcasted by a wireless node in the vicinity of the mobile device 112 through the finder application 116. The mobile device 112 can capture a broadcast signal and derive wireless node data in the signal that identifies the wireless nodes that broadcasted the signal through the analytics collector 113. The mobile device 112 can save the derived wireless node data in a database of the module 110 (or the mobile device 112) and transmit the derived data to the wireless node database 130 on the platform 105. The mobile device 112 can connect to the Internet via the broadcasted signal or another signal broadcasted by the wireless node that is dedicated to establish Internet connection.

FIG. 6 depicts illustrative wireless node data 600 obtained by the analytics collector in accordance with some embodiments of the present invention. In particular, FIG. 6 shows example data obtained from a WiFi access point. The data may include service set Identifier (SSID), basic service set identifier (BSSID or MAC address), latitude, longitude, and altitude of the access point, accuracy of vertical measurement, accuracy of horizontal measurement, and RSSI (or signal strength corresponding the broadcasted signal received by the mobile device). SSID is unique to a service provider which may control a larger number of wireless nodes. BSSID is unique to a wireless node. The collected data is transmitted to a central collection API running on an HTTPs service that supports submitting the collected data from the module 110 to the platform 105 and storing the collected in the wireless node database before publication. The API is part of the feedback module 120. The collected data is stored as raw data and additional processes (such as aggregation routine which is described below) may be performed by the platform 105 to ensure that the collected data is suitable for use by the platform 105 and other computer systems that interact with the platform 105. The stored data is available for viewing by the mobile device user whose mobile device collected the stored data or by the service provider of the mobile device user. The mobile device user may view the data obtained by the analytics collector from an interface provided by the record management module (described below). The interface may be available to the analytics collector so the collector can present the interface to the mobile device user for viewing. The interface may also be configured for the service provider's use and the service provider may view the data obtained by any of its subscriber's mobile device by accessing the record management module. Other external systems may also collect and provide similar data to the platform (e.g., the data in the file imported by the service provider).

The record management module can process the collected data to provide a visualization over a web map (e.g., Google map) to show where the data is collected and where the access point is based on the BSSID (MAC address) of the access point. The data stored in the database 130 (FIG. 1), whether it is the data came from the collector 113, the reporter 114, the feedback module 120, the record management module, or the data management module 115, can all be processed to be shown on the map. A marker for a known BSSID may be shown on the map and clicking on the marker may retrieve the data associated with that access point stored in the database 130. An edit command may also be available on the map for changing the retrieved data and moving the marker to a different location and for saving the changed data and moved marker in the database 130. The record management module may be part of the feedback module and the analytics collector may communicate with the feedback module to execute the functionality of the record management module. The record management module is provided mainly for the service provider's use. In addition to making the collected data available to the record management module, the collected data may also be available in the duplicates handling step (step 240, FIG. 2), the user correction reporter 114, and any other step or module allowing that step, the mobile device user, or the service provider to make a more informed decision in performing its function or making changes.

It is understood that the access point can be other type of wireless node (e.g., Bluetooth beacon or cellular node), and similar, corresponding data, or additional data can be obtained from the other type of wireless node. Although FIG. 6 only illustrates data collected from one WiFi access point, the mobile device can collect multiple sets of data from multiple WiFi access points. Moreover, although FIG. 1 only shows one mobile device, there may be multiple mobile devices that collect multiple sets of data from multiple WiFi access points. Mobile device user has the option to prevent the wireless node data from being gathered from the setting of the analytics collector. No personal information is gathered by the analytics collector.

Data received from all the sources (through data management module, the feedback module, the service provider's engineering system, the third part service partner, and the record management module if that module is separate from the feedback module) are saved in a raw data table on the platform which is periodically proceed into an aggregated form that is used for display and data validation purposes. Aggregation process, which may also be known as batch processing, is run automatically on the server on which the platform is implemented on a periodicity predefined by the administrator or service provider. The raw data is scanned and aggregated using BSSID as a key. When the number of individual observations for a single BSSID exceeds a pre-set limit, the data are extracted and averaged to produce a refined value. Any single observations outside 105% of the average are discarded. The raw data records are flagged as having been processed and are excluded from future processing cycles. During the batch processing, attempts are made to identify the access point's owner using a combination of BSSID (MAC address) and SSID lookup. The refined data are stored in a new database table for use in the WLDS platform.

Figure 7:
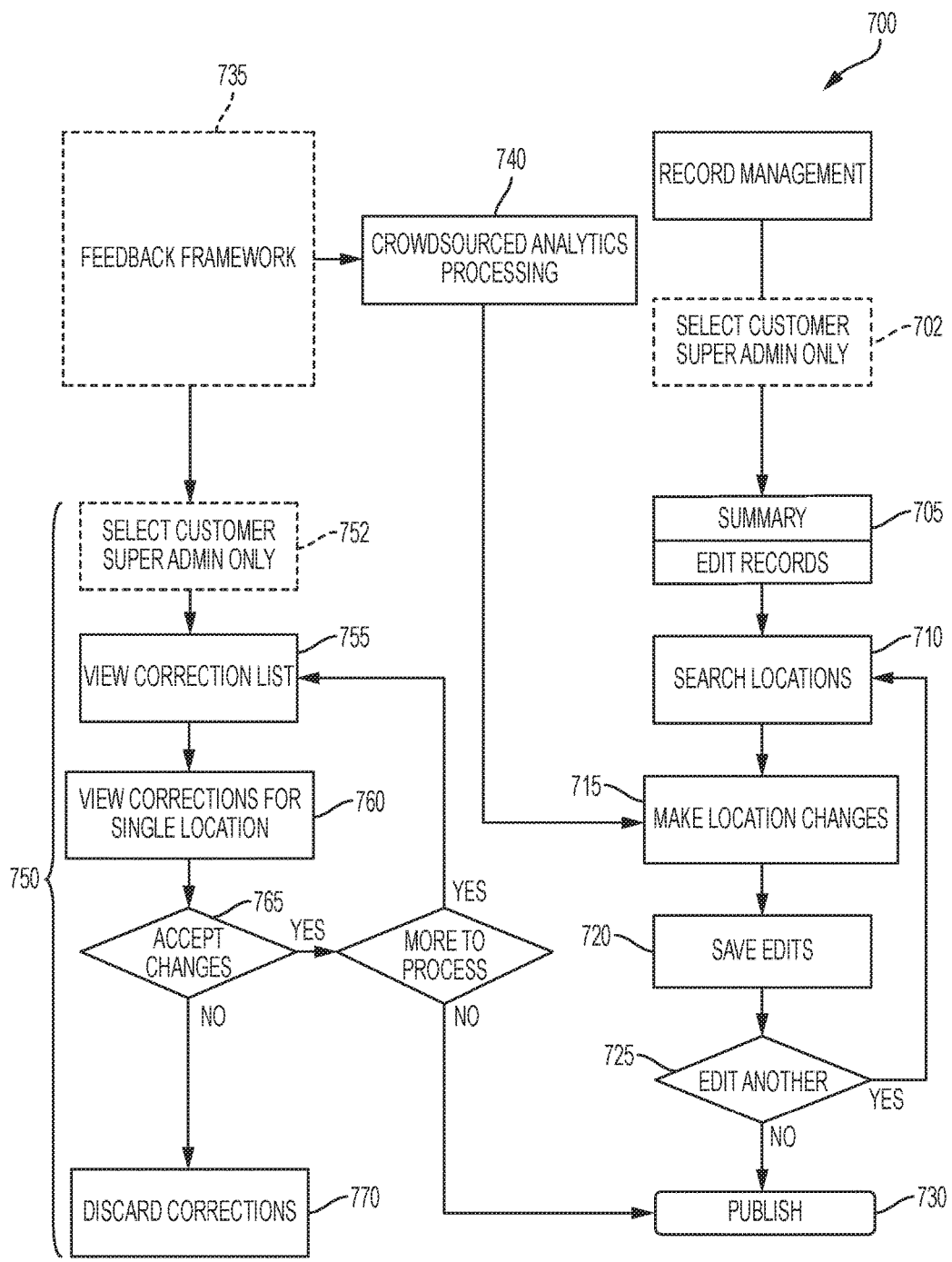
FIG. 7 depicts an illustrative process for editing data through the record management module in accordance with some embodiments of the present invention.

The record management module may be configured manage the wireless node data received from the feedback module and the data management module and the wireless node data stored in the wireless node database. The record management module can process the wireless node data to be shown on a web map. The web map displays a marker representing the location of the wireless node for each wireless node. The web map may be set at a zoom level appropriate to display the complete footprint of all the wireless nodes belonging to a service provider or other zoom level to see one or more of the wireless nodes. The web map may be displayed in the interface provided by the record management module. FIG. 7 depicts an illustrative process 700 for editing data through the record management module in accordance with some embodiments of the present invention. When the service provider uses the record management module to manage the wireless node data stored in the wireless node database, the record management module may display 705 a summary of that data and a editing command that allows the service provider to edit that data in the interface.

The interface may contain a text search box that the service provider may use to search 710 a wireless node or a site containing a wireless node. The search box may include fields for entering some or all of the data shown in FIG. 6, name, type, telephone number, location (e.g., postal address), or location coordinates of the site, or a combination thereof. The web map may be built by a combination of map overlay tiles and server-side clustering of markers prior to the display of single location markers in order to maintain responsiveness of the interface.

For each location marker displayed on the map, an additional marker (analytics marker) may be displayed on the map indicating the calculated position of the wireless node based on analytics observations (e.g., wireless node data shown in FIG. 6) collected by mobile devices. Association of analytics markers to location markers is based on BSSID. Clicking an analytics marker will automatically locate and highlight the associated location pin and clicking on the location pin will highlight the associated analytics pin if one exists. An info bubble over the location pin contains an edit button which when clicked opens an edit form for the location.

The edit form contains a map showing the location pin and any associated analytics pin(s), a text form including editable fields displayed with current data, such as some or all of the data shown in FIG. 6, name, type, telephone number, location (e.g., postal address), or location coordinates of the site, or a combination thereof, and a save command. The map and the text form may be edited 715. The location pin may be moved on the map and changes may be made in the text form if required. Moving the pin on the map automatically update the latitude and longitude fields in the text form for convenience and accuracy. The data in each editable field can also be modified. Once edits are complete, the save command may be clicked to save 720 the data prior to publication. Saving the data also closes the edit form and adds additional commands on the interface of the record management module indicating that there were changes made to the records and that the changed records may require publication. The additional commands may also allow the service provider to publish 730 the changed records and revert any edits if needed. The additional commands may further direct the service provider back to the search box to search other location, wireless nodes, or sites to make more edits 725.

The administrator may have also the authorization to select 702 a service provider and view and edit the wireless node data of that provider as discussed above. Granting the administrator the authorization 702 to view and edit the wireless node data of any service provider may be optional. As mentioned above, the record management module may also manage 715 wireless node data collected from other modules such as from the feedback module or the analytics collector 740.

The data received from the user correction reporter may also be managed by a process 750 that is part of the record management module or the feedback module. The process 750 allows the service provider to view a correction list containing data corrections submitted by a mobile device user (who is the service provider's customer) or by all the mobile device users. From the list, the service provider can narrow the corrections to view 760 only corrections for a specific location. Whether the service provider is viewing the corrections in its entirety or only corrections for a specific location, the service provider can either accept 765 or discard 770 each correction. The accept changes may be saved to the wireless node database and published 730.

The administrator may have also the authorization to select 752 a service provider and view and approve the corrections submitted by mobile device users of that service provider as discussed above. Granting the administrator the authorization 752 to view and approve the corrections submitted by mobile device users of any service provider may be optional.

The term "manage" used with respect to FIG. 7 refers to the ability allowing a service provider and an administrator to search and modify an individual record in the wireless node database, a wireless node data obtained by the analytics collector, and a data correction submitted by a mobile device user. The individual record in the wireless node database may or may not be published already. When the individual record being searched and modified is already published, the changes can be made and applied to the wireless node database in real-time (rather than have to wait for going through a series of steps like the data importation process). The changes made are also available in real-time to any computer system that interacts with the platform to access or view the data in wireless node database. The changes made to the wireless node data obtained by the analytics collector and the data correction may also be applied to the wireless node database in real-time and be available in real-time to any computer system that interacts with the platform.

Referring back to FIG. 1, the platform 105 provides different levels of access to the platform 105. The different levels may include a first level that allows individuals or entities to supply wireless node data into the platform 105 (e.g., mobile device user, an entry-level employee of the service provider) but disallows those individuals or entities to update the platform (or the wireless node database 130) with the supplied data and to publish the supplied data, a second level that allows individuals or entities to correct the supplied data or update the platform (or the wireless node database 130) with the supplied data but disallows those individuals or entities to publish the corrected data or updates (e.g., a senior-level employee of the service provider), and a third level that allows individuals or entities to publish the updates or any supplied data (e.g., the operator or administrator of the platform). In some embodiments, the second level and the third level may be combined into one level. In some embodiments, the individuals or entities who supplied wireless node data into the platform may also be allowed to publish the supplied data without subjecting the supplied data to other individuals or entities' review and approval. In this situation, the supplied data can be immediately published. Other levels of access are also contemplated. The different levels may also be determined based on how the data is received (e.g., through the data management module, the feedback module, he service provider's engineering system, or the third part service partner) and who provided the data (e.g., the service provider, the mobile device user, the engineer, or the third part service partner). The different levels of access allow different individuals or entities to import and normalize wireless node data, generate updates to data already exists in the wireless node database, review updates, either approve or reject updates or data for publication, and publish a new or updated footprint. The administrator can configure the platform with the number of levels that meets the service provider's need, create the number of accounts needed for each level with each account associated with an individual or entity, monitor the activities in each account and level, and change the level of access for any individual or entity if required via the administrative portal 140. The administrative portal 140 may also be the portal through which the account holders must log in in order to access the platform. Access to the platform is protected by account holder credentials.

Figure 8:
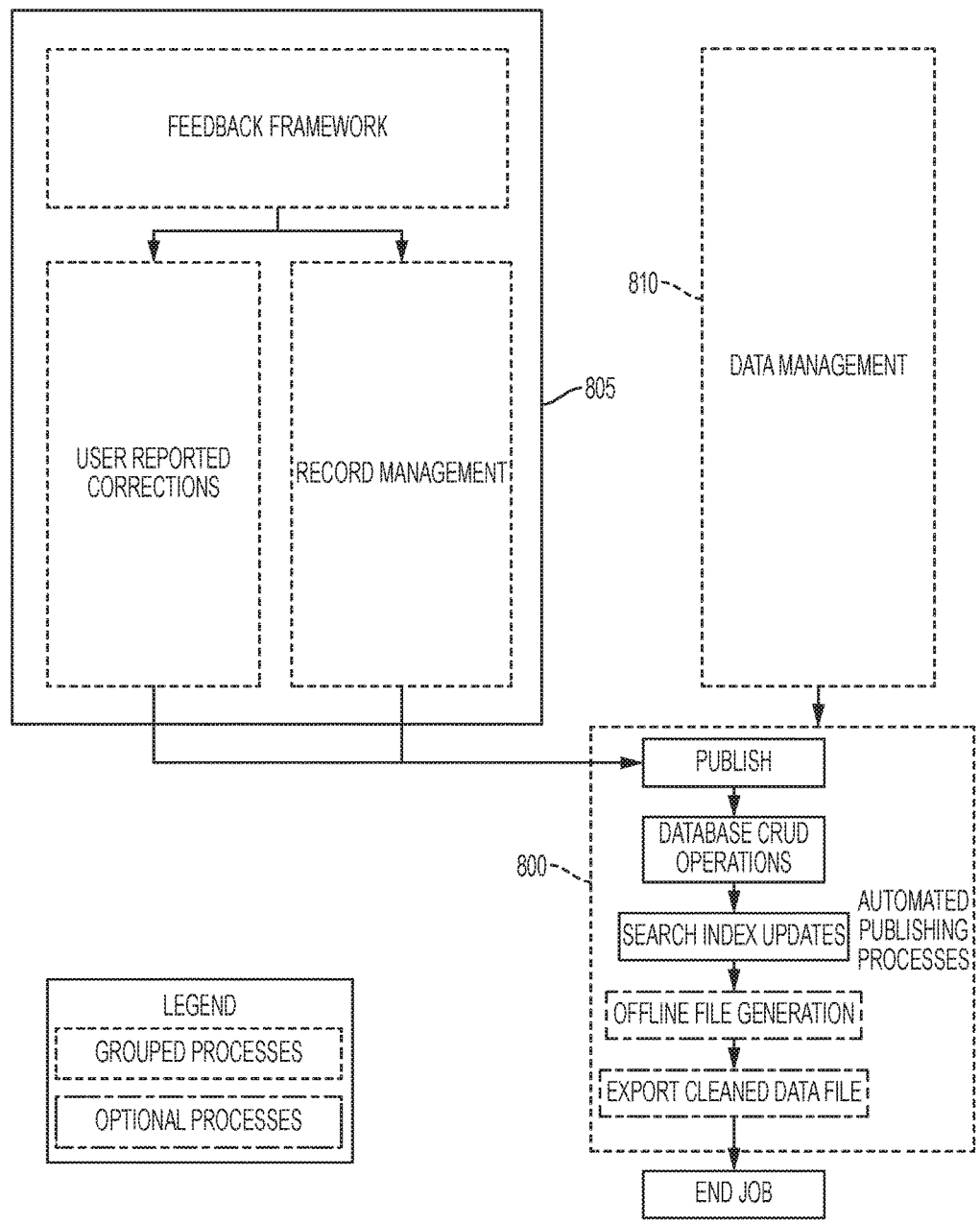
FIG. 8 depicts an illustrative process for publishing wireless node data in accordance with some embodiments of the present invention.

FIG. 8 depicts an illustrative process 800 for publishing wireless node data in accordance with some embodiments of the present invention. The process 800 is performed by the publication module 125 shown in FIG. 1. Publication refers to a process that makes wireless node data or wireless node data correction submitted to the platform by a party available to other parties who have access the platform for viewing. Prior to publication, the wireless node data or wireless node data corrections may be available only to the party that submitted the data. For example, the data imported by a service provider through the data management module may not be available to its subscribers before the imported data is published and may be available to its subscribers once the imported data is published. For another example, the corrections submitted by a mobile device user through the user correction reporter or the feedback module may not be available to his or her service provide before the corrections are published and may available to his or her service provider once the corrections are published. The same also applies to the analytics collector and other modules that can obtain and submit wireless node data or wireless node data corrections. The wireless node data to be published may be received from the feedback module 805, the data management module 810, or the wireless node database (130, FIG. 1). The publication functionality may be available to the administrator or other authorized personnel such as a senior-level employee of the service provider.

The publication process 800 may involve initializing a publication background process, backing up wireless node data currently published, deactivating data in the currently published data that does not appear in the submitted data, reactivating previously deactivated data that is present in the submitted data, adding only submitted data that is not in the currently published data into the currently published data, updating data whose published hashes no longer match submitted hashes, updating service provider-specific analytics data cache (if required) and map overlays in other areas of the platform (such as the record management module), creating an export data file in the service provider's format and field order containing data produced as a result of performing all of the above steps. The data produced is the published data. Once the data is published, the published data is saved in the wireless node database, and a copy of the published data is moved to a production table within the platform and is transmitted to the local database 117. The local database 117 derives its data from the wireless node database 130 and is a replica of the wireless node database. However, it is understood that the module 110 may not include the local database 117 but may instead query and receive data from the wireless node database 130 directly.

Figure 9A:
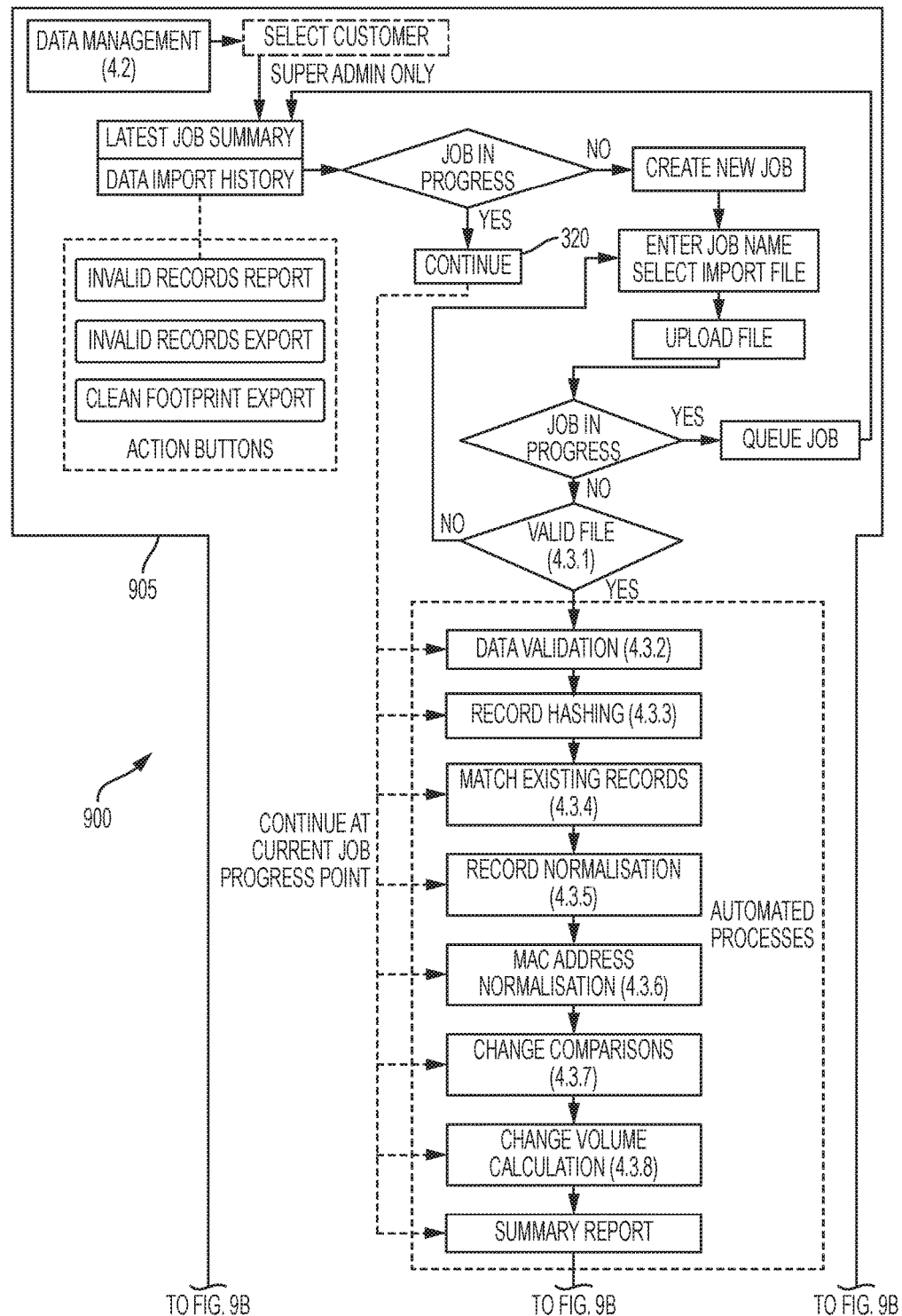
FIGS. 9A-9C depict a detail view of an illustrative method for building and updating a wireless node database in accordance with some embodiments of the present invention.
Figure 9B:
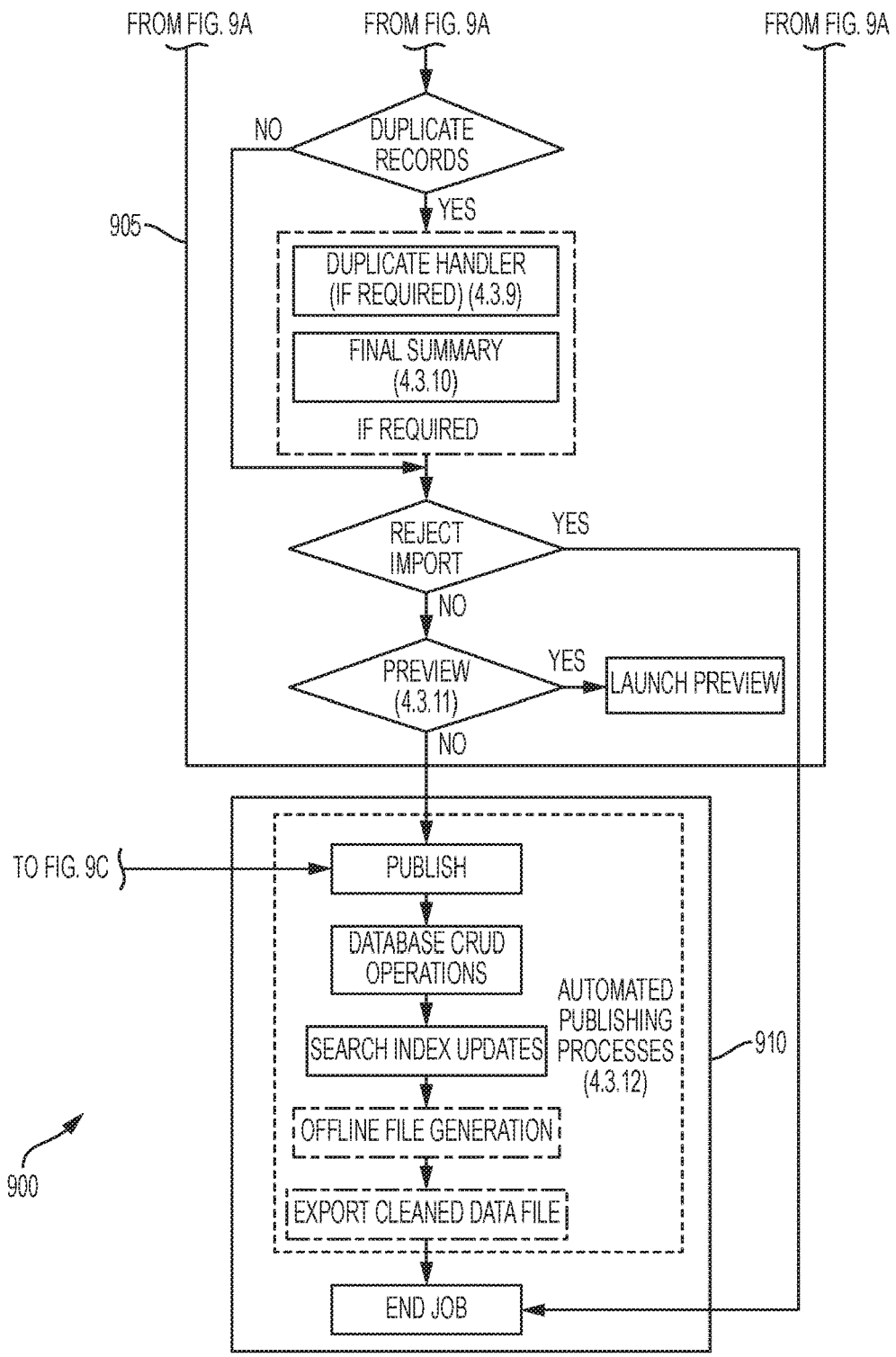
Figure 9C:
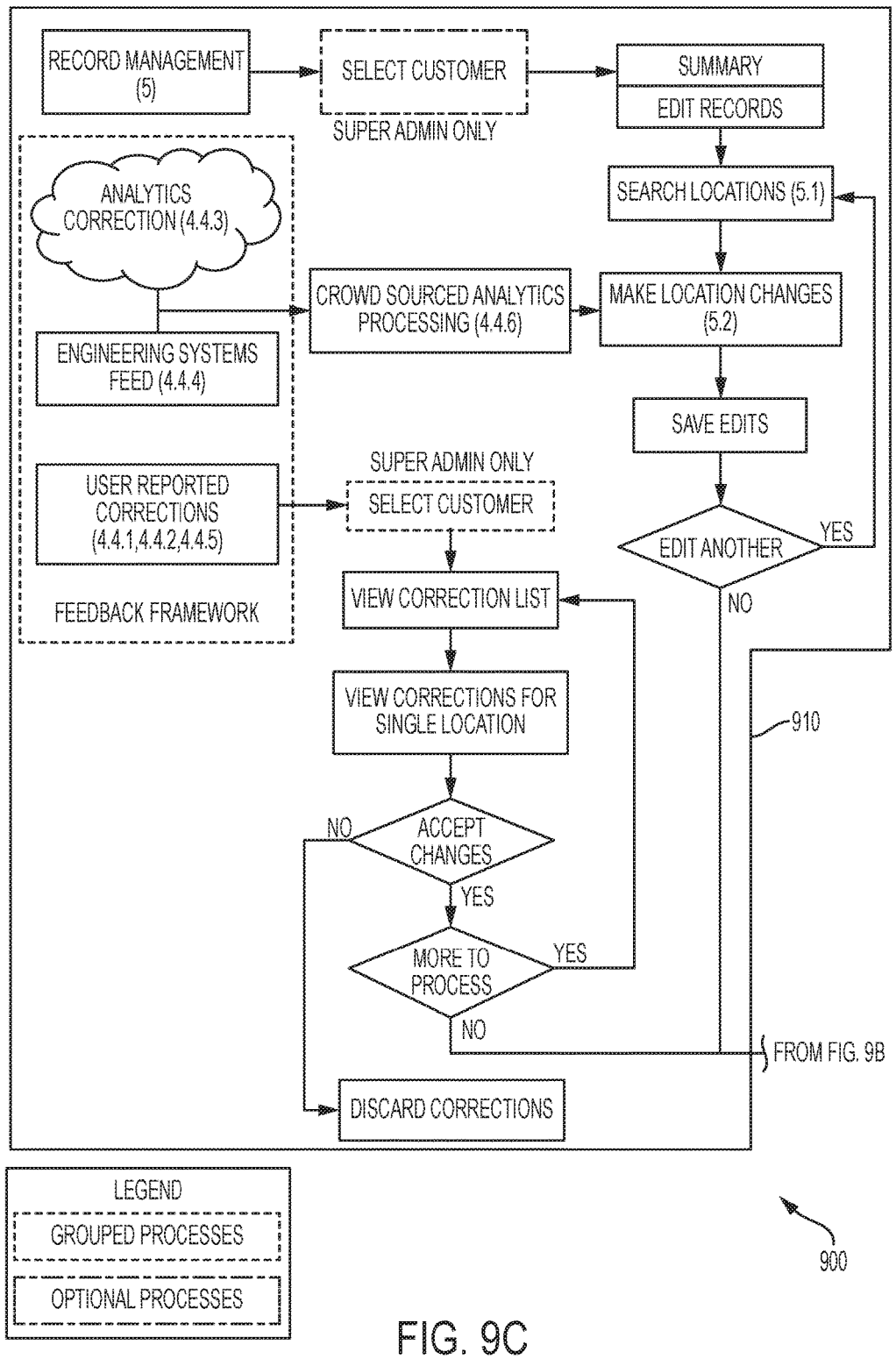

FIGS. 9A-9C depict a detail view of an illustrative method 900 for building and updating a wireless node database in accordance with some embodiments of the present invention. The method 900 may be performed by the system 100 shown in FIG. 1. Reference number 905 corresponds to the data management module 115 or steps performed by that module and to FIGS. 3A-3B. Reference number 910 corresponds to the feedback module 120 or steps performed by that module and to FIG. 7. Reference number 910 corresponds to the publication module 910 or steps performed by that module and to FIG. 8.

The platform is able to provide the latitude, longitude, and altitude of the wireless node and the street address of the location containing the wireless node if that information is available. These information may be collectively referred to as the location information. The platform, or the combination of the platform and the external systems, helps keep the location information of the wireless node up to date on a more frequent or continuing basis as compared to the location information maintained by the engineering system or the service provider. The platform, or the combination of the platform and the external systems, also provides a more comprehensive or complete collection of all the location information as compared to all the location information maintained by the engineering system or the service provider. Note that given the significant number of mobile devices and other external systems continues to roll out, the platform allows for the quick and reliable integration of the location information into a system that can be used by different entities. As part of this process, the location information or other wireless node data collected by the platform from sources other than the service provider such as from the crowd sourced data (data from mobile devices) is used to supersede or overwrite the location information or other wireless node data provided by the service provider (or related source such as engineering that support the service provider). The updated data that supersedes the service provider (or service provider and source that are from entities that support the service provider) are provided back to the service provider or other entities in order to provide more up to date information.

Any information received from the feedback module or any other sources (e.g., through the service provider's engineering system, the third part service partner, the administrative portal, and the record management module if that module is separate from the feedback module) can be fed into the data management module and be processed by that module.

The present disclosure describes a harmonization step which may correspond to steps 225, 235, 240, and/or 245 of FIG. 2, steps 350, 355, 370, 375, 385 and/or 390 of FIGS. 3A-3B, and/or the steps performed by record management module (or combinations thereof). In general, the harmonization step may refer to a step performed by the platform 105 to resolve inconsistencies (or conflicting information) in the received wireless node data with respect to individuals nodes. The inconsistencies may include different wireless node data received for the same wireless node, the wireless node data received from an external system for one wireless node is different from the wireless node data stored in the wireless node database for the same wireless node, and the wireless node data received from an external system is not in the wireless node database. The inconsistencies may be resolved manually or automatically. When an inconsistency is resolved manually, the harmonization step may provide a user interface for manual review and selection of wireless node data. The user interface may be a window generated by the platform that includes a web map displaying the location of the wireless nodes (which may be based on the wireless node data received from external systems, the wireless nodes in the wireless node data base, or a combination thereof depending on what the inconsistency is) and a number of editable fields showing the wireless node data of selected wireless node. Each location may be shown with a marker, and moving the marker may modify the data in the corresponding editable fields (e.g., latitude, longitude, and altitude). The data in the editable fields may also be modified which in turn may move the marker to the new location. FIG. 10 depicts an illustrative user interface in accordance with some embodiments of the present invention.

When an inconsistency is resolved automatically, the platform may resolve the inconsistency based on a criteria. The criteria may include the external system from which the wireless node data is received (e.g., certain external systems may be prioritized), the date and time the wireless node data is received by the external system or the platform (e.g., most recent wireless node data takes precedence), verifying wireless node data received from one external system (e.g., the mobile device) for node with wireless node data received from another external system for the same node (e.g., the tool an engineer uses to report on installations and repairs), whether the wireless node data was manually or automatically provided to the platform (e.g., wireless node data that are automatically fed into the platform such as those from the engineer systems may be selected over the data that are manually entered such as those from the user correction reporter since manually typing is prone errors), or a criteria determined by the administrator.

When a new wireless node is submitted to the platform (e.g., the wireless node data of the wireless node does not exist in the wireless node database), the platform can determine whether to add the new wireless node by determining whether there is a certain number of times the node is detected by the external systems (e.g., 25 times or other number predetermined by the administrator or the service provider) over a period of time (e.g., a week, a month, or other duration predetermined by the administrator or the service provider). This would indicate the information is reliable and can be added to the wireless node database. The same process can also apply to received wireless node data that would be used to update the corresponding wireless node data in the database. Crowd mobile device may scan and detect personal hotspots activated by individuals on their phones but the system is not intended for such personal hotspots and the reliability process, which checks whether a node has been detected at the location over a period of time will likely eliminate the addition of personal hotspots to the database. This process may also be one of the above criteria.

Figure 11:
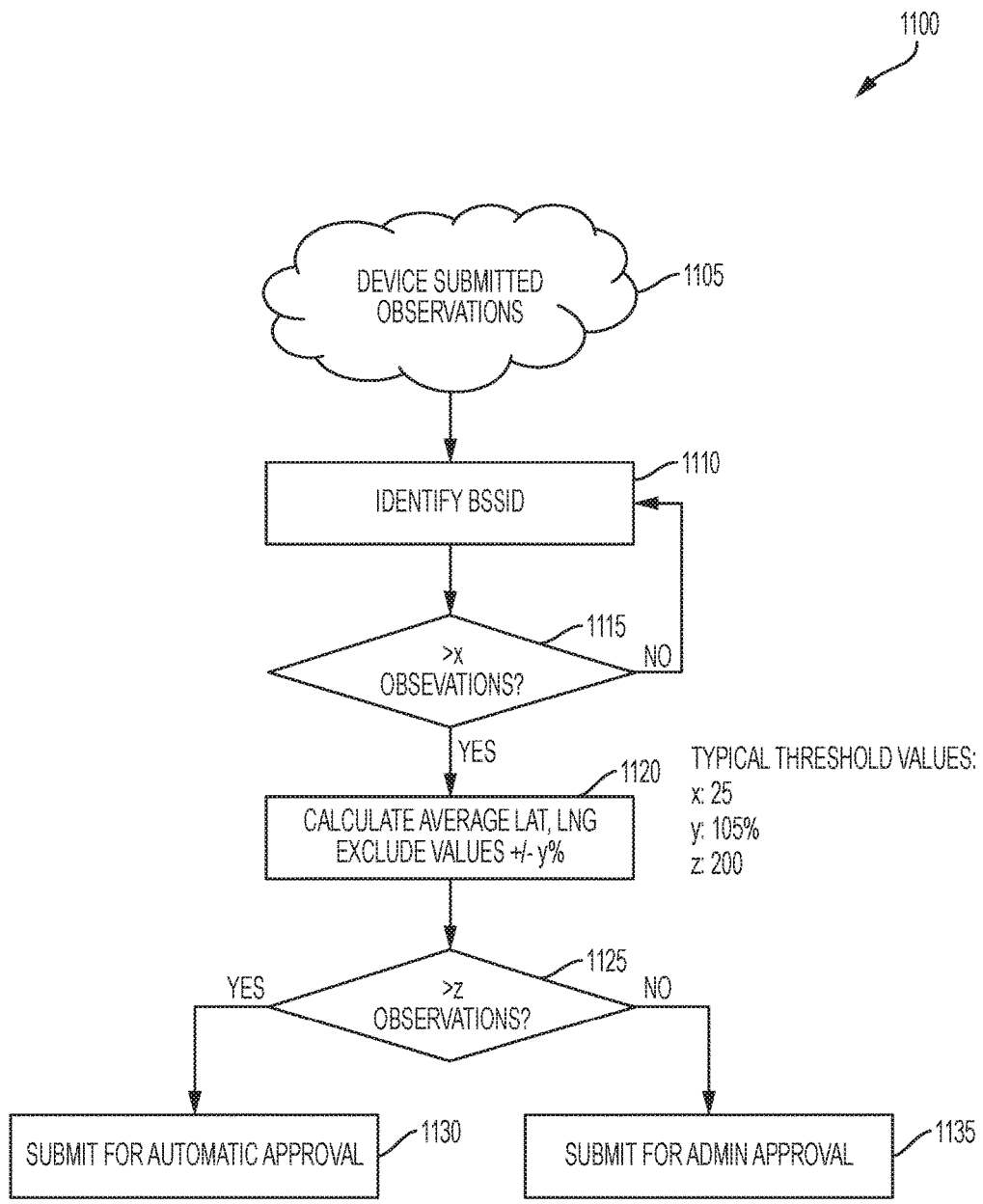
FIG. 11 depicts an illustrative a process for determining whether to add a new wireless node into the wireless node database in accordance with some embodiments of the present invention.

FIG. 11 depicts an illustrative a process 1100 for determining whether to add a new wireless node (or new wireless node data) into the wireless node database in accordance with some embodiments of the present invention. The process 1100 is described with respect to the wireless node data received from the mobile devices, but it may also apply to wireless node data received from other external systems. The process 1100 may commence with receiving 1105 wireless node data (or observations) from the mobile devices (112, FIG. 1). The received data may be compared with the existing wireless node data in the database (130, FIG. 1) to determine whether that data or node is available in the database. If the received data is not in the database, BSSID (MAC address) (or some other identifier) in the received data is identified 1110 but the received data is not saved to the database or integrated with the database. The data that is not in the database (or the data from the node that is not in the database) may be received multiple times 1115 from the same mobile device or different mobile devices and BSSID in that data is identified each time. In order to save that data or node in the database, the same BSSID may have to be received or observed for a predetermined number of times. Preferably, the predetermined number is 25 but it may be other number decided by the administrator or the service provider. If the same BSSID is not observed enough times, the process 1110 continues to receive wireless node data from the mobile devices and identify BSSID in each received data until the same BSSID is observed for the predetermined number of times. Each time the data is received, BSSID and other information (e.g., latitude, longitude, and altitude) may be saved in memory (different from the database) to keep track of how many times BSSID has been observed and keep a record of the other information.

After the same BSSID has been observed for the predetermined number of times, the process 1100 calculates 1120 the average latitude, longitude, and altitude from all the received data that contains the same BSSID. During or after the calculation, the process 11100 may continue to receive wireless node data from the mobile devices and identify BSSID in each received data. Thus, data with the same BSSID may continue to be received. The calculated latitude, longitude, and altitude averages may be used to help determine whether the node to be added to the database (or the addition of the new node) should be automatically approved or manually approved by the administrator. The administrator or the service provider may set a tolerance of ±5% for one, some, or all of the calculated averages and a required number of subsequent data needed to be received for the same BSSID that falls within the allowed tolerance for determining whether the approval process should be automatic or manual. The tolerance is preferably 5% but it may be other percentages. The required number is preferably 200 by it may be other numbers. For example, if the platform receives more than 200 subsequent data that has a latitude, longitude, and/or altitude that is within the 5% tolerance from the calculated averages, the new node is automatically 1130 added to the database. If the platform receives less than 200, the addition of the new node is subject to approval by the administrator or the service provider. Subsequent data refers to data received after the calculation has started. In some embodiments, the required number may refer to the total number of data the platform received for the calculation step and after the calculation step has started for the same BSSID. For example, if the platform calculates the average using 25 received data and the required number is 200, the platform may only need to receive 175 data after the execution of the calculation step to determine whether the approval process should be automatic or manual.

The process 1100 can also be applied to determine whether and how the received wireless node data should be used to update the corresponding wireless node data (or the corresponding wireless node) in the database.

BSSID or MAC address are described as example. Other identifiers are contemplated.

The altitude may be based on a device measurement or entered by a user such as an engineer by specifying a floor, or by other techniques.

It should be understood that the described system (e.g., the platform) or methods are computer-implemented.

It should be understood as being unconventional that in some respects the platform can deliver information that supersedes, updates, or modifies pertinent information about a wireless node that a service provider (or its supporting entities such as engineers) first deployed or operates and possibly first notified the platform about.

The external systems are systems that operate independent of the platform and that need to communicate and interact with the platform via the network. An external system can be under a different network domain or network administration than the platform and its network elements such as one or more of its servers.

The external systems may be implemented with a software application so the external system is configured or trusted to provide a file required by or compatible with the platform. Therefore, the validation steps (e.g., the file validation step, the data validation step, and/or the normalization step) may not be necessary. This can be an application installed on a mobile device, a barcode scanner, or other tool used by an engineer to report on installations or repairs. It is possible to have a trusted relationship in some other way.

Module and platform can refer to software module and software platform, respectively, that is executed by a computer processor for carrying out its functionality. Note that the platform can, depending on the context, include or incorporate a computer such as a set of servers. Module and platform are compatible with Windows, OS, Android-based operating system, or other computer operating system. Module and platform may be installed in a computer system or mobile device to perform its functions and allow users to operate the module and platform. The computer system may be a desktop computer, server, or other computer. The mobile device may be a smartphone, personal digital assistant (PDA), tablet, or the like. Once installed, the computer readable instructions of the module and platform may be stored in non-volatile (non-transient) memory (e.g., programmable logic) and executed by a processor of the computer system or mobile device to perform their respective functions described in this disclosure. Those of ordinary skill in the art will understand that the respective functions are described explicitly or implicitly based on reasonable understanding of the text. It will also be understood a module or software application (or application component) is a set of software code or computer executable instructions.

It is understood that the computer system described in this disclosure uses a combination of non-transitory and transitory memory to carry out its programmed operations.

Mobile device described with respect to the figures can be a Wi-Fi-enabled device, Bluetooth-enabled device, cellular-enabled device, or other mobile or portable device that has wireless networking capability (e.g., hardware and software). Examples of such devices include laptop computers, tablet computers, smartphones, and personal digital assistants (PDAs). Service provider described with respect to the figures can also be a corporation, a venue owner, or other entity. User of the platform or the system in FIG. 1 can be a service provider or an individual or entities who wants to obtain information about all the wireless nodes operated by service providers, corporations, and venue owners such as a government agency.

The words "may" and "can" are used in the present description to indicate that this is one embodiment but the description should not be understood to be the only embodiment.

Exemplary systems and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention. Applications of the technology to other fields are also contemplated Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

To the extent it is not explicit, it would be understood from the present descriptions that inventions directed to apparatus, method, and computer readable medium are contemplated. For example, a description of a system (or component) also supports a description of a method or computer readable medium. It will also be understood that the processes or software describe computer executable instructions (in non-transitory memory) that are executed to perform steps for carrying out the processes or software.

The use of the word "by" in the context where it communicates certain supporting feature is meant to be understood to be open ended in the same way as "comprising."

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

The invention claimed is:

1. A computer-implemented system for providing a wireless node database service to a plurality of service providers that each owns or operates a set of wireless nodes located in a geographically dispersed area and for improving quality of information delivered as part of the wireless node database service, comprising:

a wireless location data service platform comprising one or more servers and associated software stored in non-transitory memory, wherein the software configures the servers to provide the platform as a service to the plurality of service providers over a network, wherein on the servers, the platform:

communicates and interacts with particular types of external systems including (a) computer terminals of at least some of the service providers, (b) engineering systems managing wireless nodes of one or more of the service providers, (c) maintenance system associated with engineer responsible for installing new wireless nodes or responsible for repairing or replacing existing wireless nodes of the service providers, (d) end-user mobile devices that are subscribed to the service providers' service, and (d) systems of third party service partners whose service is engaged by service providers to maintain wireless node data collected by the service providers or the engineering systems, wherein as part of communications and interactions the platform receives files containing wireless node data from the different types of external systems and each file includes a number of fields and specific type of wireless node data in each field;

harmonizes the wireless node data in the received files that has conflicting information with respect to individual nodes by comparing the wireless node data in the received files to determine inconsistencies in the wireless node data in the received files with respect to individual nodes and providing a user interface for manual review and selection of data or automatic conflict resolution based on a criteria, wherein the data being harmonized is from different types of external systems with respect to the individual nodes;

adds a new wireless node, removes an existing wireless node, or updates an existing node from the set of wireless nodes owned or operated by a particular service provider by identifying a new wireless node or an existing wireless node from wireless node data received from the external systems other than that of the service provider and evaluating whether a threshold amount of reliable information has been received to verify the existence of the new wireless node, the removal of the existing wireless node, or the update of the existing wireless node; and produces updated wireless node data that includes the new wireless node, that is without the removed existing wireless node, or that includes the updated wireless node for a corresponding one of the service providers, wherein the wireless node data is converted to be in a format that is compatible with the external system of the corresponding service provider; and publishes the updated wireless node data so they are available to service providers other than the service provider supplied the data and to other users of the platform.

2. The system according to claim 1, wherein the platform further validates the received files by checking whether the number of fields in each file matches to a predetermined number of fields and whether the specific type of wireless node data in each field matches to the type of wireless node data assigned to that field, the file with matching number of fields and matching type of data in all the fields is a validated file.

3. The system according to claim 2, wherein the platform further validates the wireless node data in each validated file by checking whether the wireless node data in each validated file includes all fields required by the platform and whether the wireless node data in each field of each validated file is within a range specified by the platform for that field, the wireless node data including all the required fields and data within the specified range is a validated data.

4. The system according to claim 3, wherein the data being harmonized is from the validated data.

5. The system according to claim 1, wherein the wireless node data comprises geographical location data for identifying the location of the wireless node, identification data for identifying the wireless node, accuracy of the geographical location data, signal strength received from the wireless node, the date the wireless node data was obtained or observed, or a combination thereof.

6. The system according to claim 5 wherein the geographical location data includes latitude, longitude, and altitude of the wireless node and the identification data includes SSID and BSSID of the wireless node.

7. The system according to claim 1, wherein the wireless node is a Wi-Fi access point, a Bluetooth beacon, or a cellular node.

8. A computer-implemented system for providing a wireless node database service to a plurality of service providers that each owns or operates a set of wireless nodes located in a geographically dispersed area and for improving quality of information delivered as part of the wireless node database service, comprising:

a wireless location data service platform comprising one or more servers and associated software stored in non-transitory memory, wherein the software configures the servers to provide the platform as a service to the plurality of service providers over a network, wherein on the servers, the platform:

communicates and interacts with particular types of external systems including (a) computer terminals of at least some of the service providers, (b) engineering systems managing wireless nodes of one or more of the service providers, (c) maintenance system associated with engineer responsible for installing new wireless nodes or responsible for repairing or replacing existing wireless nodes of the service providers, (d) end-user mobile devices that are subscribed to the service providers' service, and (d) systems of third party service partners whose service is engaged by service providers to maintain wireless node data collected by the service providers or the engineering systems, wherein as part of communications and interactions the platform receives files containing wireless node data from the different types of external systems and each file includes a number of fields and specific type of wireless node data in each field;

validates the files by checking whether the number of fields in each file matches to a predetermined number of fields and whether the specific type of wireless node data in each field matches to the type of wireless node data assigned to that field, the file with matching number of fields and matching type of data in all the fields is a validated file;

validates the wireless node data in each validated file by checking whether the wireless node data in each validated file includes all fields required by the platform and whether the wireless node data in each field of each validated file is within a range specified by the platform for that field, the wireless node data including all the required fields and data within the specified range is a validated data;

stores validated wireless node data in a wireless node database maintained by the platform;

harmonizes the validated data that has conflicting information with respect to individual nodes by comparing validated data to determine inconsistencies in the validated data with respect to individual nodes and providing a user interface for manual review and selection of data or automatic conflict resolution based on a criteria, wherein the data being harmonized is from different types of external systems with respect to the individual nodes;

adds a new wireless node, removes an existing wireless node, or updates an existing wireless node from the set of wireless nodes owned or operated by a particular service provider by identifying a new wireless node or an existing wireless node from wireless node data received from the external systems other than that of the service provider and evaluating whether a threshold amount of reliable information has been received to verify the existence of the new wireless node, the removal of the existing wireless node, or the update of the existing wireless node; and produces updated wireless node data that includes the new wireless node, that is without the removed existing wireless node, or that includes the updated wireless node for a corresponding one of the service providers, wherein the wireless node data is converted to be in a format that is compatible with the external system of the corresponding service provider; and publishes the updated wireless node data so they are available to service providers other than the service provider supplied the data and to other users of the platform.

9. A computer-implemented method for providing a wireless node database service to a plurality of service providers that each owns or operates a set of wireless nodes located in a geographically dispersed area and for improving quality of information delivered as part of the wireless node database service, comprising:

communicating and interacting with particular types of external systems including (a) computer terminals of at least some of the service providers, (b) engineering systems managing wireless nodes of one or more of the service providers, (c) maintenance system associated with engineer responsible for installing new wireless nodes or responsible for repairing or replacing existing wireless nodes of the service providers, (d) end-user mobile devices that are subscribed to the service providers' service, and (d) systems of third party service partners whose service is engaged by service providers to maintain wireless node data collected by the service providers or the engineering systems, wherein as part of the communications and interactions step, the step includes receiving files containing wireless node data from the different types of external systems and each file includes a number of fields and specific type of wireless node data in each field;

validating the files by checking whether the number of fields in each file matches to a predetermined number of fields and whether the specific type of wireless node data in each field matches to the type of wireless node data assigned to that field, the file with matching number of fields and matching type of data in all the fields is a validated file;

validating the wireless node data in each validated file by checking whether the wireless node data in each validated file includes all fields required by the platform and whether the wireless node data in each field of each validated file is within a range specified by the platform for that field, the wireless node data including all the required fields and data within the specified range is a validated data;

storing validated wireless node data in a wireless node database maintained by the platform;

harmonizing the validated data that has conflicting information with respect to individual nodes by comparing validated data to determine inconsistencies in the validated data with respect to individual nodes and providing a user interface for manual review and selection of data or automatic conflict resolution based on a criteria, wherein the data being harmonized is from different types of external systems with respect to the individual nodes;

adding a new wireless node, removes an existing wireless node, or updates an existing wireless node from the set of wireless nodes owned or operated by a particular service provider by identifying a new wireless node or an existing wireless node from wireless node data received from the external systems other than that of the service provider and evaluating whether a threshold amount of reliable information has been received to verify the existence of the new wireless node, the removal of the existing wireless node, or the update of the existing wireless node; and producing updated wireless node data that includes the new wireless node, that is without the removed existing wireless node, or that includes the updated wireless node for a corresponding one of the service providers, wherein the wireless node data is converted to be in a format that is compatible with the external system of the corresponding service provider; and publishing the updated wireless node data so they are available to service providers other than the service provider supplied the data and to other users of the platform.

\* \* \* \* \*